United States Patent
Hong et al.

(10) Patent No.: US 10,412,535 B2
(45) Date of Patent: Sep. 10, 2019

(54) METHOD AND DEVICE FOR PROVIDING INFORMATION IN COMMUNICATION NETWORK USING A BEACON SERVICE

(71) Applicant: SAMSUNG ELECTRONICS CO., LTD., Suwon-si (KR)

(72) Inventors: Dohy Hong, Fontenay sous Bois (FR); Dojun Byun, Seoul (KR); Sinseok Seo, Seongnam-si (KR); Kiseok Lee, Yongin-si (KR); Daekyu Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/568,090

(22) PCT Filed: Apr. 27, 2016

(86) PCT No.: PCT/KR2016/004407
§ 371 (c)(1),
(2) Date: Oct. 20, 2017

(87) PCT Pub. No.: WO2016/175553
PCT Pub. Date: Nov. 3, 2016

(65) Prior Publication Data
US 2018/0146387 A1 May 24, 2018

(30) Foreign Application Priority Data
Apr. 30, 2015 (KR) .................. 10-2015-0061928

(51) Int. Cl.
*H04W 4/02* (2018.01)
*H04W 4/00* (2018.01)
(Continued)

(52) U.S. Cl.
CPC ............... *H04W 4/02* (2013.01); *H04W 4/00* (2013.01); *H04W 4/023* (2013.01); *H04W 4/029* (2018.02);
(Continued)

(58) Field of Classification Search
CPC ......... H04W 24/10; H04W 4/80; H04W 4/02; H04W 4/029; H04W 24/08; H04W 4/023;
(Continued)

(56) References Cited

U.S. PATENT DOCUMENTS

RE42,927 E       11/2011  Want et al.
2002/0194141 A1*  12/2002  Langensteiner ....... G06Q 20/02
                                                                  705/67
(Continued)

FOREIGN PATENT DOCUMENTS

KR      10-0977503 B1    8/2010
KR    10-2010-0131615 A  12/2010
(Continued)

OTHER PUBLICATIONS

Communication dated Mar. 13, 2018, issued by the European Patent Office in counterpart European application No. 16786739.9.
(Continued)

*Primary Examiner* — Tejis Daya
(74) *Attorney, Agent, or Firm* — Sughrue Mion, PLLC

(57) ABSTRACT

According to one embodiment of the present disclosure, a method and a terminal can be provided, and a beacon service method of the terminal comprises the steps of: transmitting a beacon including identification information of the terminal; receiving beacon-related information from a reception device having received the beacon; receiving a beacon-related information report request message from an information collection device; and transmitting stored beacon-related information to the information collection device. In
(Continued)

addition, the present disclosure can provide a beacon reception device communicating with the terminal and an operation method therefor, an information collection device communicating with the terminal and an operation method therefor, and a server for providing a beacon service and an operation method of the server.

16 Claims, 16 Drawing Sheets

(51) Int. Cl.
*H04W 8/20* (2009.01)
*H04W 88/02* (2009.01)
*H04W 88/18* (2009.01)
*H04W 4/029* (2018.01)
*H04W 24/08* (2009.01)
*H04W 24/10* (2009.01)
*H04W 4/80* (2018.01)

(52) U.S. Cl.
CPC ............... *H04W 4/80* (2018.02); *H04W 8/20* (2013.01); *H04W 24/08* (2013.01); *H04W 24/10* (2013.01); *H04W 88/02* (2013.01); *H04W 88/18* (2013.01); *H04W 88/184* (2013.01)

(58) Field of Classification Search
CPC ....... H04W 88/18; H04W 88/02; H04W 8/20; H04W 4/00; H04W 88/184
See application file for complete search history.

(56) References Cited

U.S. PATENT DOCUMENTS

| | | | |
|---|---|---|---|
| 2006/0087474 A1* | 4/2006 | Do | G01S 1/024 342/386 |
| 2009/0116448 A1* | 5/2009 | Nam | H04W 48/16 370/331 |
| 2010/0309831 A1* | 12/2010 | Yeh | H04W 52/0216 370/311 |
| 2013/0343196 A1* | 12/2013 | Swedo | H04L 43/0817 370/241 |
| 2014/0065964 A1* | 3/2014 | Turunen | H04W 8/005 455/41.2 |
| 2014/0179352 A1* | 6/2014 | V.M. | H04W 4/043 455/456.2 |
| 2014/0254569 A1 | 9/2014 | Abraham et al. | |
| 2015/0005011 A1 | 1/2015 | Nehrenz et al. | |
| 2015/0181384 A1* | 6/2015 | Mayor | H04W 24/02 455/456.1 |
| 2015/0235477 A1* | 8/2015 | Simkin | G07B 15/02 705/417 |
| 2015/0249954 A1* | 9/2015 | Patil | H04W 48/16 370/338 |
| 2015/0282046 A1* | 10/2015 | Shin | H04W 40/244 455/434 |
| 2015/0296347 A1* | 10/2015 | Roth | H04W 4/04 705/326 |
| 2015/0382150 A1* | 12/2015 | Ansermet | G06Q 10/0639 455/41.1 |
| 2016/0178727 A1* | 6/2016 | Bottazzi | G01S 5/10 375/130 |
| 2016/0286007 A1* | 9/2016 | Selfridge | G06F 17/3056 |
| 2016/0353382 A1* | 12/2016 | Xue | H04W 52/0251 |
| 2017/0238354 A1* | 8/2017 | Fujita | H04W 8/00 370/329 |

FOREIGN PATENT DOCUMENTS

| | | |
|---|---|---|
| KR | 10-2013-0138302 A | 12/2013 |
| KR | 10-2014-0059066 A | 5/2014 |

OTHER PUBLICATIONS

Search Report dated Aug. 8, 2016, issued by the International Searching Authority in counterpart International Patent Application No. PCT/KR2016/004407 (PCT/ISA/210).

Written Opinion dated Aug. 8, 2016, issued by the International Searching Authority in counterpart International Patent Application No. PCT/KR2016/004407 (PCT/ISA/237).

* cited by examiner

FIG. 5

| TRANSMISSION CONDITION | IDENTIFICATION METHOD |
|---|---|
| WHEN INCLUDED IN SPECIFIC GROUP | COMPARE IDENTIFICATION INFORMATION INCLUDED IN BEACON WITH STORED GROUP INFORMATION |
| WHEN ENTERING SPECIFIC DISTANCE | COMPARE RECEIVED SIGNAL STRENGTH OF BEACON SIGNAL WITH PREDETERMINED THRESHOLD VALUE |
| WHEN STAYING AT SPECIFIC LOCATION | COMPARE TIME WHEN IDENTIFICATION INFORMATION INCLUDED IN BEACON SIGNAL IS DETECTED WITH THRESHOLD VALUE |
| WHEN PASSING THROUGH SPECIFIC LOCATION | COMPARE RECEIVED SIGNAL STRENGTH OF BEACON SIGNAL CORRESPONDING TO TIME INFORMATION |
| WHEN REQUESTING BEACON-RELATED INFORMATION | CONFIRM BEACON-RELATED INFORMATION REQUEST |

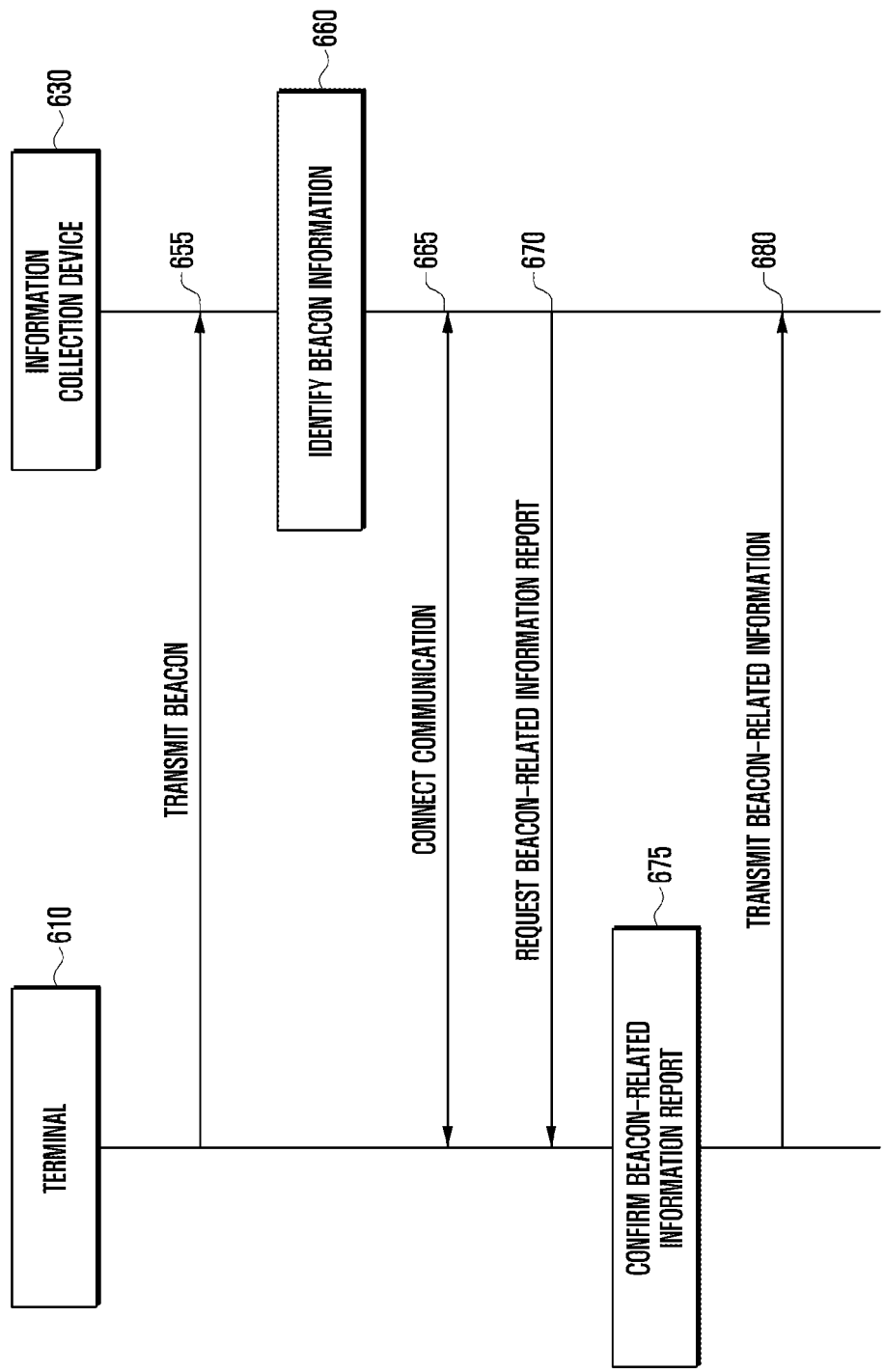

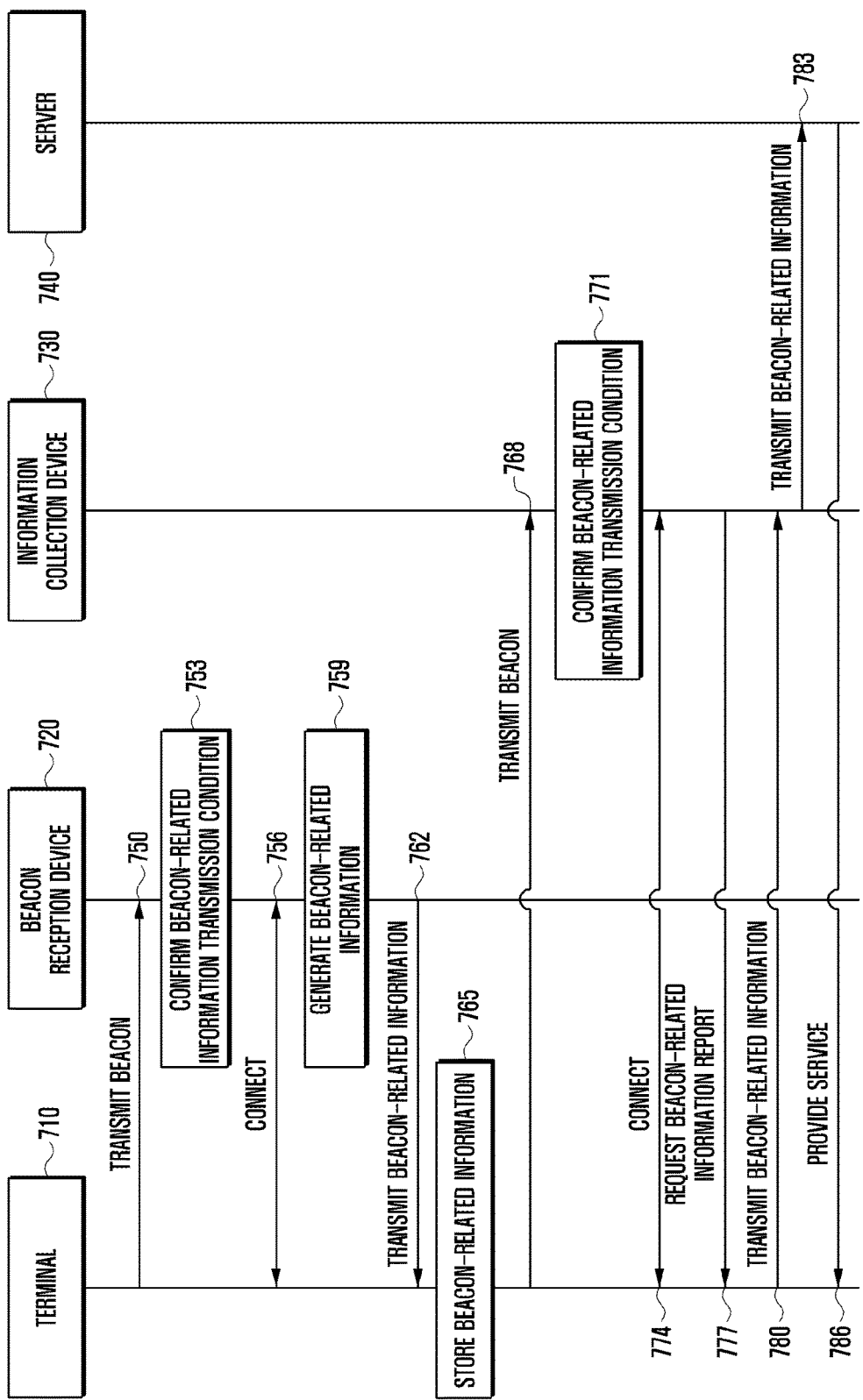

METHOD AND DEVICE FOR PROVIDING INFORMATION IN COMMUNICATION NETWORK USING A BEACON SERVICE

TECHNICAL FIELD

The present disclosure relate to a method and a device for providing information in a communication network, and more specifically, to a method and a device for providing information using a beacon service.

BACKGROUND ART

The Internet is being evolved from a human-centered connection network through which a human being generates and consumes information to the Internet of Things (IoT) network having information between distributed components like things transmitted and received therethrough and processing the information. The Internet of Everything (IoE) technology in which the big data processing technology, etc. is combined with the IoT technology by connection with a cloud server, etc. has also emerged. To implement the IoT, technology elements, such as a sensing technology, wired and wireless communication and network infrastructure, a service interface technology, and a security technology, have been required. Recently, technologies such as a sensor network, machine to machine (M2M), and machine type communication (MTC) for connecting between things have been researched.

In the IoT environment, an intelligent Internet technology (IT) service that creates a new value in human life by collecting and analyzing data generated in the connected things may be provided. The IoT may apply for fields, such as a smart home, a smart building, a smart city, a smart car or a connected car, a smart grid, health care, smart appliances, and an advanced healthcare service, by fusing and combining the existing information technology (IT) with various industries.

Currently, the most actively used service in the Internet of Things (IoT) technologies is a beacon service. The beacon service refers to a service that periodically/continuously transmits arbitrary information through a Bluetooth low energy (BLE) technology and allows a device and a third device receiving the information to interwork with each other to thereby provide the information to a user or allow the user to perform a meaningful operation.

As one of services using a beacon, a small BLE device called a beacon continuously transmits the same ID through the BLE. The ID which the beacon transmits and a location where the beacon is installed are registered in a server for providing a service. When a user terminal having a BLE function (for example, a smart phone) receives the ID, it queries a location where a beacon transmitting a corresponding ID is installed to the server, confirms the location, and then performs an operation promised to be executed at the corresponding location. For example, if the location confirmed by querying the server is a department store, a department store application can be automatically executed and a discount coupon can be provided to a user. This means that a connection between the terminal and the service server is always required in a way that the user terminal is provided with the service by interworking with the server which is the third device.

DISCLOSURE

Technical Problem

An object of the present disclosure is directed to provision of an improved method and device for providing information in a communication network. More specifically, an object of the present disclosure provides a method and a device for providing information using a beacon service.

Another object of the present disclosure is directed to provision of an improved method and device for providing information by solving a disadvantage of always maintaining a connection state between a beacon transmitter and a server or a beacon reception device and the server since the conventional beacon service provides important information (installation location information of a beacon, user information of a terminal) from the server. If the connection relationship with the server is always maintained, not only the communication cost for the connection but also the server usage cost can be incurred, and the service that can be provided through the beacon depends on the information provided by the server.

Objects of the present disclosure are not limited to the above-mentioned objects. That is, other objects that are not mentioned may be obviously understood by those skilled in the art to which the present disclosure pertains from the following description.

Technical Solution

Various embodiments of the present disclosure are directed to the provision of a beacon service method of a terminal, including: transmitting a beacon including identification information of the terminal; receiving beacon-related information from a reception device having received the beacon; receiving a beacon-related information report request message from an information collection device; and transmitting stored beacon-related information to the information collection device.

Various embodiments of the present disclosure are directed to the provision of a terminal for a beacon service, including: a communication unit configured to transmit and receive a signal; and a controller configured to perform a control to transmit a beacon including identification information of the terminal, receive beacon-related information from a reception device receiving the beacon, receive a beacon-related information report request message from an information collection device, and transmit stored beacon-related information to the information collection device.

Various embodiments of the present disclosure are directed to the provision of a beacon service method of a beacon reception device including: receiving a beacon from at least one terminal; determining whether the terminal is a beacon-related information transmission target; and transmitting beacon-related information based on the received beacon, if the terminal is the beacon-related information transmission target.

Various embodiments of the present disclosure are directed to the provision of a beacon reception device, including: a communication unit configured to transmit and receive a signal; and a controller configured to perform a control to receive a beacon from at least one terminal, determine whether the terminal is a beacon-related information transmission target, and transmit beacon-related information based on the received beacon if it is determined that the terminal is a beacon-related information transmission target.

Various embodiments of the present disclosure are directed to the provision of a beacon service method of an information collection device including: receiving a beacon from at least one terminal; confirming whether beacon-related information is stored in the terminal transmitting the beacon; transmitting the beacon-related information report request message to the terminal, if the beacon-related information is stored in the terminal; and receiving the beacon-related information from the terminal.

Various embodiments of the present disclosure are directed to the provision of an information collection device, including: a transceiver configured to transmit and receive a signal; and a controller configured to perform a control to receive a beacon from at least one terminal, confirm whether beacon-related information is stored in a terminal transmitting the beacon, transmit a beacon-related information report request message to the terminal if the beacon-related information is stored in the terminal, and receive the beacon-related information from the terminal.

Advantageous Effects

According to the embodiment of the present disclosure, it is possible to provide the improved method and device for providing information in a communication network. In addition, according to the embodiment of the present disclosure, it is possible to provide the method and device for providing information using a beacon service.

Furthermore, according to the embodiment of the present disclosure, it is possible to provide a new type of beacon service by lowering the dependence on the third device and enabling the interworking between the beacon service devices, that are disconnected from each other, onto the network.

BRIEF DESCRIPTION OF THE DRAWINGS

FIG. 5 is a view for explaining a method for confirming a beacon-related information transmission condition according to an embodiment of the present disclosure.

FIG. 6 is a diagram for explaining a signal flow between a terminal and an information collection device according to an embodiment of the present disclosure.

FIG. 7 is a diagram for explaining signal flows between the respective devices in the beacon service system according to the embodiment of the present disclosure.

BEST MODE

Figure 1:
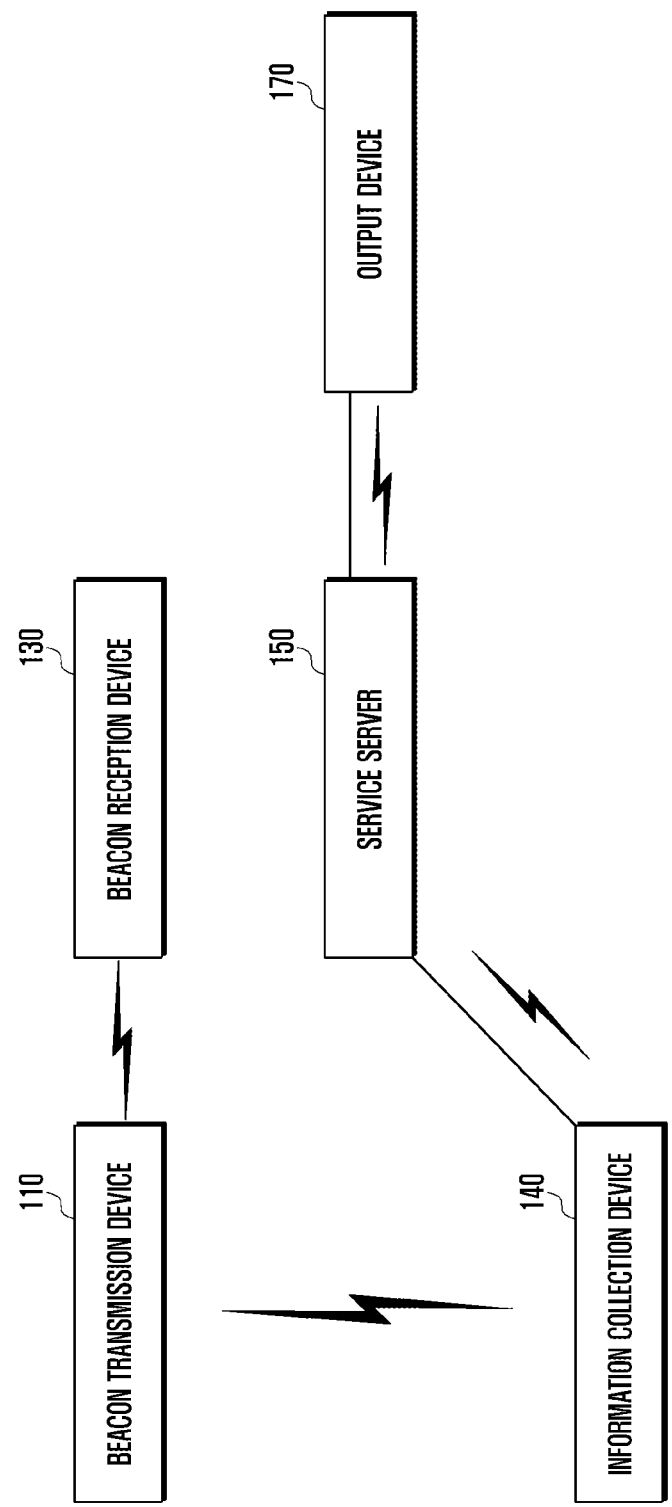
FIG. 1 is a diagram illustrating a system for providing a beacon service according to an embodiment of the present disclosure.

Hereinafter, various embodiments of the present disclosure will be described in detail with reference to the accompanying drawings. At this time, it is to be noted that like reference numerals denote like elements in the accompanying drawings. Further, detailed descriptions related to well-known functions or configurations will be ruled out in order not to unnecessarily obscure the subject matter of the present disclosure. It is to be noted that only parts necessary to understand operations according to various embodiments of the present disclosure will be described below and the description of other parts will be omitted so as not to unnecessarily obscure the subject matter of the present disclosure.

Terms used in the present disclosure are defined.

The term 'terminal' used in the present specification may be named a mobile station (MS), user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or other terms. Various embodiments of the terminal may be used in various applications such as cellular phones, smart phones with a wireless communication function, personal digital assistants (PDAs) with a wireless communication function, wireless modems, portable computers with a wireless communication function, photographing devices like a digital camera with a wireless communication function, gaming devices with a wireless communication function, music storage and playback appliances with a wireless communication function, Internet appliances capable of wireless Internet access and browsing, and portable units or terminals in which combinations of the functions are incorporated. In addition, the terminal may also include a wearable device (e.g., electronic glasses, an electronic apparel, an electronic bracelet, an electronic necklace, an electronic tattoo, or a smart watch).

In the present specification, the Internet of Things (IoT) is an intelligent infrastructure and service technology that connects all surrounding things by a wired/wireless network based on an information communication technology to exchange information between people and things and things and things and communicate with each other. The IoT terminal may be operated by at least one IoT provider and may have unique identification keys for IoT terminals which are managed by each IoT provider.

In the present specification, a signal transmitting method for transmitting a plurality of devices other than a specific device as received targets is referred to as advertise or broadcast.

In the present specification, a beacon means a signal transmitted to transmit identification information of a beacon transmission device, location information of the beacon transmission device, or status information of the beacon transmission device. The transmission may be an advertise or broadcast transmitting method. In addition, the beacon signal may also be transmitted by a multicast or unicast transmitting method. In the present specification, the beacon may be used as the same meaning as a beacon signal when used as a meaning of a transmission object.

The beacon may be transmitted using a near field wireless communication method. The near field wireless communication may include Bluetooth, infrared communication, and the like. In the present specification, the beacon will be mainly described with reference to a beacon using Bluetooth low energy (BLE). However, the scope of the present disclosure is not limited thereto, and the beacon may be transmitted using various wireless communication methods.

In the present specification, the beacon service serves to periodically or aperiodically transmit a beacon using technologies such as the BLE to provide arbitrary information, allow a device and/or a third device receiving the beacon to transmit information to a user device, and allow a terminal receiving the information from the device and/or the third device receiving the beacon to provide the information to information collection entity.

In the present specification, a beacon signal is called a device transmitting or receiving a beacon signal. The device for transmitting a beacon may be referred to as a beacon transmission device, a beacon transmitting device, a beacon transmission apparatus, or a beacon transmitting apparatus. The beacon device may be one of the terminals as described above. Further, the device for receiving a beacon may be a beacon reception device or a beacon reception apparatus.

The beacon transmitted from the beacon device may include identification information. The identification information may include identification information on the beacon device or identification information on a user using the beacon device. The identification information may be referred to as a user identifier (UID). The user identifier may be unique identification information on the beacon device or the user using the beacon device. In addition, the beacon may include service identification information. The service identification information is information for identifying services requested by the beacon device transmitting the beacon or the user using the beacon device.

FIG. 1 is a diagram illustrating a system for providing a beacon service according to an embodiment of the present disclosure.

Referring to FIG. 1, a system for providing a beacon service may include a beacon transmission device 110, a beacon reception device 130, an information collection device 140, and a service server 150. The information collection device 140 may be a beacon reception device. The system may further include an output device 170. The system may include a plurality of beacon transmission devices and a plurality of beacon reception devices.

The beacon transmission device 110 may periodically or non-periodically transmit a beacon. The method for transmitting a beacon signal may also use a broadcast signal transmission method, a multicast signal transmission method, or a unicast signal transmission method for a specific reception device. The beacon may include identification information.

The beacon transmission device 110 may perform communication with the beacon reception device 130 and the service server 150. The beacon transmission device 110 may receive a response signal from the beacon reception device 130 that has received a beacon transmitted from the beacon transmission device 110 or from the service server 150. The response signal may include the information that the beacon reception device 130 or the service server 150 wants to provide to the beacon transmission device.

The beacon reception device 130 may be connected to the beacon transmission device 110 by wireless communication. The beacon reception device 130 may receive the beacon from the beacon transmission device 110. The beacon reception device 130 may identify the information on the beacon transmission device 110 based on the received beacon. For example, the beacon reception device 130 may identify information on a distance between the beacon transmission device 110 and the beacon reception device 130, information on the number of times where the beacon transmission device 110 is located at a predetermined distance from the beacon reception device 130, information on time when the beacon transmission device 110 stays within the predetermined distance from the beacon reception device 130, or the like. The information identified based on the beacon received by the beacon reception device 130 may be referred to as beacon-related information. Information on beacon received signal strength may be used to understand the information on the distance or the location.

The beacon-related information may be stored in the beacon reception device 130. In addition, the beacon reception device 130 may transmit the beacon-related information to the beacon transmission device 110. The beacon-related information may be transmitted along with the beacon transmission device 110 while mapped to identification information identifying the beacon transmission device 110. As the identification information identifying the beacon transmission device 110, the identification information included in the beacon received by the beacon reception device 130 may be used. Meanwhile, the beacon-related information may further include the identification information of the beacon reception device 130. In this way, the information on the beacon reception device which generates or identifies the beacon-related information may be provided. Since the beacon reception device 130 may receive the beacon from the plurality of beacon transmission devices 110, when analyzing the beacons received from the respective beacon transmission devices, the beacon reception device 130 may map the identification information included in each beacon to the beacon-related information acquired by identifying the beacons transmitted from the respective beacon transmission devices and process the mapped information. In addition, the beacon reception device 130 may transmit the beacon-related information to the corresponding beacon transmission device 110. At this time, the beacon identification information may be transmitted together with the beacon-related information while mapped to the beacon-related information.

In the embodiment of the present disclosure, the beacon transmission device 110 receiving the beacon-related information from the beacon reception device 130 may store the received beacon-related information. If there is the stored beacon-related information, the beacon transmission device 110 may transmit an indicator indicating that there is the beacon-related information. As the indicator, the bit information may be used. The indicator may be transmitted by being included in or mapped to the beacon transmitted from the beacon transmission device 110. It may be identified whether the beacon-related information is stored based on presence or absence of the indicator, and it may be indicated whether the beacon-related information is stored according to the content of the indicator (for example, it may be indicated that when 1-bit information is used, no beacon-related information is present if the bit information is 0, and the beacon-related information is present if the bit information is 1).

If receiving the beacon-related information report request, the beacon transmission device 110 may transmit the beacon-related information report request to entity transmitting the stored beacon-related information report request. For example, the entity transmitting the information report request may be the information collection device 140 or the service server 150. The information collection device 140 may be a beacon reception device. When the information collection device is the beacon reception device, the information collection device may be a device capable of performing wired or wireless communication with the service server 150.

The entity (hereinafter, referred to as information collection entity) transmitting the beacon-related information request may analyze the beacon transmitted from the beacon transmission device 110. The information collection entity may identify (determine) whether or not there is the beacon-related information stored in the beacon transmission device 110 based on the indicator included in the beacon. If there is the beacon-related information stored in the beacon transmission device 110, the information collection entity may transmit to the beacon transmission device 110 the beacon-related information report request for requesting that the stored beacon-related information is reported to the information collection entity.

The beacon transmission device 110 receiving the beacon-related information report request may transmit the stored beacon-related information to the information collection entity. In the beacon-related information report request and beacon-related information report process, the encryption information may be used. For example, when transmitting the beacon-related information to the beacon transmission device, the beacon reception device 130 may transmit the encryption information including first encrypting information, and when transmitting the beacon-related information report request, the information collection entity may transmit the encryption information including second encryption information, and when the first encryption information corresponds to the second encryption information, the beacon transmission device 110 may be operated to report the stored information to the information collection entity. In addition, the beacon transmission device 110 may transmit to the information collection entity only the information which corresponds to the encryption information in the stored information.

Meanwhile, the information collection entity may also transmit the beacon-related information report request without analyzing the beacon transmitted from the beacon transmission device 110. For example, since the information collection entity is a device having an information collection function, the information collection entity may transmit information indicating that it can collect the information. The information collection entity may transmit the information using the broadcast method. If there is the stored beacon-related information, the beacon transmission device which has received the information transmitted from the information collection entity may transmit the stored information to the information collection entity.

The information collection device 140 may transmit the beacon-related information received from the beacon transmission device 110 to the service server 150. The information collection device 140 may directly transmit the received beacon-related information to the service server 150 or may transmit some of the information extracted from the beacon-related information received by the information collection device 140 to the service server 150.

The service server 150 may receive the beacon-related information from the information collection device 140 or the beacon transmission device 110. The service server 150 may provide various services using the received beacon-related information. For example, advertisement, coupon information, guidance information, and the like may be transmitted to the beacon transmission device 110 based on the beacon-related information. In addition, the beacon-related information may also be used for data collection or analysis purposes.

The beacon-related information may include the information on the beacon transmission device 110 and the information on the beacon reception device 130. As the beacon reception device related information, the identification information of the beacon reception device may be mapped to information on a place where the beacon reception device is installed or articles, services, and a flow line or the like related to the beacon reception device. The service server 150 may collect information on a place, an object, a service, or the like in which the user using the beacon transmission device 110 is interested, based on the mapped information and may provide advertisement, coupon information, guide information, or the like as described above according to the collected information.

Meanwhile, the service provision may be a benefit provided to the beacon transmission device 110 in return for the beacon-related information report of the beacon transmission device 110. The beacon-related information may be information on the beacon transmission device 110 that an operator operating the service server 150 wants to acquire or the user of the beacon transmission device 110. Therefore, coupon information, discount information, and free service information may be provided in return for the beacon transmission device 110 related information report. The free service information may be, for example, free communication service information provision. The free communication service may include providing free communication time, providing free communication capacity, and the like. The communication service may include Internet communication WiFi and the like. The free communication service information may be information on authority to use the free communication service.

When the beacon transmission device 110 reports the beacon-related information, the service server 150 may provide the services. In addition, the service server 150 may request provision of additional information on the user of the beacon transmission device 110 or the beacon transmission device 110. The relationship between the beacon transmission device 110 and the beacon reception device 130 can be understood as beacon-related information, but information on the user using the beacon transmission device 110 is transmitted to the beacon transmission device 110 as personal information, which can be provided if the user who uses it agrees. User information may include personal information about age, gender, occupation, interests, and the like. When the beacon-related information is provided together with corresponding user information mapped to the beacon transmission device 110, the service server 150 can provide the service as a payment for providing beacon-related information and user information The relationship between the beacon transmission device 110 and the beacon reception device 130 may be understood as the beacon-related information, but the information on the user using the beacon transmission device 110 which is personal information may be provided if the user using the beacon transmission device 110 agrees. The user information may include personal information on age, gender, occupation, interests, and the like. If the beacon-related information is provided together with the user information mapped or corresponding to the beacon transmission device 110, the service server 150 may provide the service in return for the provision of the beacon-related information and the user information.

If necessary, the service server 150 may also transmit the beacon-related information or the information extracted from the beacon-related information to the output device 170. The output device 170 may output the received information. The output device 170 may also be included in the service server 150.

Figure 2:
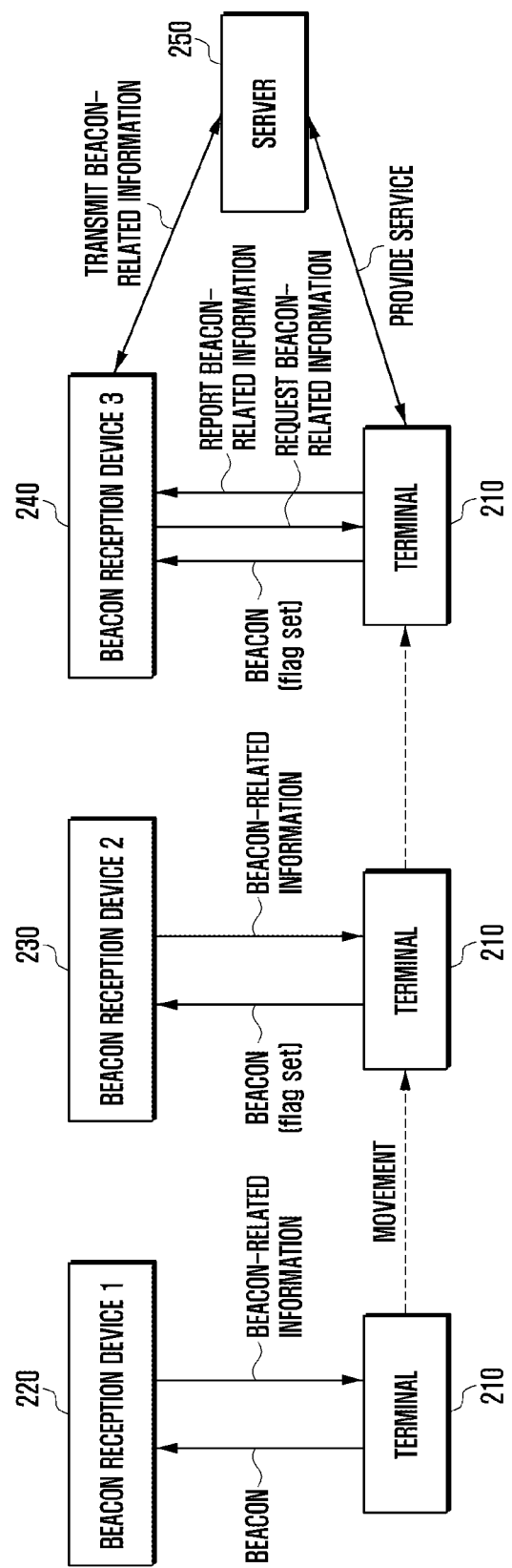
FIG. 2 is a diagram for explaining an operation scenario of a beacon system according to the embodiment of the present disclosure.

FIG. 2 is a diagram for explaining an operation scenario of a beacon system according to the embodiment of the present disclosure.

Referring to FIG. 2, the beacon service system includes a terminal 210, a plurality of beacon reception devices 220, 230, and 240, and a server 250. The terminal 210 is a beacon transmission device that transmits a beacon. The server 250 is a service server. Assume that the terminal 210 moves in the order of beacon reception device 1 220->beacon reception device 2 230->beacon reception device 3 240. In the embodiment of the present disclosure, the beacon reception device 3 240 is operated as the information collection device or the information collection entity.

In the system of FIG. 2, it is assumed that the beacon reception device 1 220 and the beacon reception device 2 230 are not connected to the server 250 and the beacon reception device 3 240 is connected to the server 250. The connection may include a wired communication connection or a wireless communication connection. The fact that the beacon reception devices 220 and 230 and the server are not connected or not connected to each other in the embodiment of the present disclosure means that the beacon reception device may not transmit or transfer to the server 250 the information on the beacon transmitted from the terminal 210 or the beacon-related information acquired from the beacon that the terminal 210 transmits. Accordingly, the fact may mean a permanent disconnection state, or a disconnection state at a certain point in time.

The terminal 210 transmits a beacon periodically or aperiodically. The beacon may include an identifier of the terminal 210. The beacon may further include an indicator for indicating whether the beacon-related information is stored in the terminal. The indicator may be defined as an information storage indicator. It is assumed that the beacon-related information is not stored in the current terminal 210. At this time, the indicator may indicate that the beacon-related information is not stored in the terminal 210. This case may be expressed as a state in which a flag is not set. The movement of the terminal 210 to the beacon reception device may include operations of allowing the terminal 210 and the beacon reception device to transmit or receive a beacon or enter a distance, a predetermined distance in which communication may be performed, perform the authentication between the two devices, or the like.

The beacon reception device 1 220 may receive the beacon transmitted from the terminal 210. The beacon reception device 1 220 may generate the beacon-related information by analyzing the beacon received from the terminal 210. The beacon reception device 1 220 may transmit the beacon-related information to the terminal 210. Since the beacon reception device 1 220 is not connected to the server 250, it cannot directly transmit the beacon-related information to the server 250. Therefore, the beacon-related information is transmitted to the terminal 210. In order to transmit the beacon-related information to the terminal 210, the terminal 210 and the beacon reception device 1 220 may perform a wireless communication connection for performing data communication. For example, the terminal 210 and the beacon reception device 1 220 can be connected to each other via the Bluetooth communication.

Upon receiving the beacon-related information, the terminal 210 may change an information storage indicator of the beacon signal transmitted from the terminal. Since the beacon-related information is in the stored state, the information storage indicator may indicate that the beacon-related information is stored in the terminal 210. For example, if 1-bit information is used, the information storage indicator may be set to be 0 when the beacon-related information is not stored, and the information storage indicator may be set to be 1 when the beacon-related information is stored. This state may be represented by a flat setting state. The terminal transmits the information storage indictor indicating that it stores the beacon-related information.

Next, the terminal 210 moves to the beacon reception device 2 230. The beacon reception device 2 230 may know that there is the beacon-related information stored in the terminal 210, based on the beacon received from the terminal 210. However, since the beacon reception device 2 230 is not connected to the server 250, the beacon reception device 230 does not request the terminal 210 to report the beacon-related information. The beacon reception device 2 230 may generate the beacon-related information based on the beacon received from the terminal 210, in the same manner as the operation of the beacon reception device 1 220. In addition, the beacon-related information may be transmitted to the terminal 210. Meanwhile, the generation and transmission of the beacon-related information of the beacon reception device 2 230 are not essential. That is, if the beacon reception device 2 230 satisfies the beacon-related information generation condition, the beacon reception device 230 may generate the beacon-related information and transmit the generated beacon-related information. Therefore, if the beacon-related information generation condition is not satisfied, the beacon-related information may not be generated.

Since the beacon-related information is still generated in the terminal 210, the information storage indicator of the terminal indicates that there is the beacon-related information stored in the terminal 210. The terminal 210 moves to the beacon reception device 3 240.

The beacon reception device 3 240 may know that there is the beacon-related information stored in the terminal 210, based on the beacon received from the terminal 210. Since the beacon reception device 3 240 is a device connected to the server 250, the beacon reception device 3 240 may request the terminal 210 to report the beacon-related information stored in the terminal 210. For example, the beacon reception device 3 240 may transmit a beacon-related information report request message to the terminal 210.

The terminal 210 may report the beacon-related information stored in the beacon reception device 3 240 based on the beacon-related information report request message received from the beacon reception device 3 240. The terminal 210 may report only some of the stored beacon-related information and report all of the stored beacon-related information. The terminal 210 may selectively report the beacon reception device 3 240 when reporting the beacon-related information. That is, the terminal 210 may transmit the beacon-related information if there is a specific condition or an additional input at the time of receiving the beacon-related information report request instead of always reporting the beacon-related information in response to the beacon-related information report request. The specific condition may be a confirmation of the identification information that is previously set between the terminal 210 and the beacon reception device 3 240. The additional input may be an additional optional input of the terminal user 210. An additional input means may be generated in the terminal 210 in association with the beacon-related information report in response to the beacon-related information report request, and the terminal 210 may selectively report the beacon-related information based on the additional input.

When the terminal 210 reports the beacon-related information, the terminal 210 may delete the reported information. If all of the stored beacon-related information is reported and the beacon-related information stored in the terminal 210 is not present, the information storage indicator of the beacon transmitted from the terminal 210 may indicate that there is no beacon-related information stored in the terminal 210. If only some of the stored beacon-related information is reported, some information is still stored in the terminal 210, so that the information storage indicator of the beacon may indicate that the beacon-related information stored in the terminal 210 exists.

The beacon reception device 3 240 may transmit the received beacon-related information to the server 250. The beacon reception device 3 240 may transmit the beacon-related information to the server 250 every time the beacon-related information is received, transmit the beacon-related information every predetermined period, and transmit the beacon-related information to the server 250 when receiving the received beacon-related information report request received from the server 250.

The server 250 may analyze the beacon-related information received from the beacon reception device 3 240. The server 250 may provide a service to the terminal 210 based on the analyzed beacon-related information. For example, the service may include an advertisement service, a guidance service, a coupon service, and the like. Also, the service may be the information provided to the terminal 210 in return for the beacon-related information report. The service may include a free communication service (provide free Wi-Fi). In addition to the beacon-related information, the service may be provided to the terminal 210 when the user information on the terminal 210 is provided. The user information may include personal information on age, gender, occupation, interests, and the like of a user.

Meanwhile, it is described that the server 250 described above receives the beacon-related information from the beacon reception device 3 240. However, the present disclosure is not limited thereto, and the server 250 may directly receive the beacon-related information from the terminal 250. In this case, the server 250 may include a function of the beacon reception device 3 240 or may include a device corresponding to the beacon reception device 3 240.

The beacon reception device 1 220 and the beacon reception device 2 230 are not directly connected to the server 250 by the above-mentioned method, but may use the terminal 210 to transmit the beacon-related information generated from the beacon reception device 1 220 and the beacon reception device 2 230. The server 250 may collect the information on the beacon transmission device 210 and the user thereof by the manner as described above. The information on the user may include information on a flow line of a user. For example, if the identification information of the beacon reception device included in the beacon-related information is used, the information on the beacon transmission device 210 or the flow line of the user may be identified.

Figure 3:
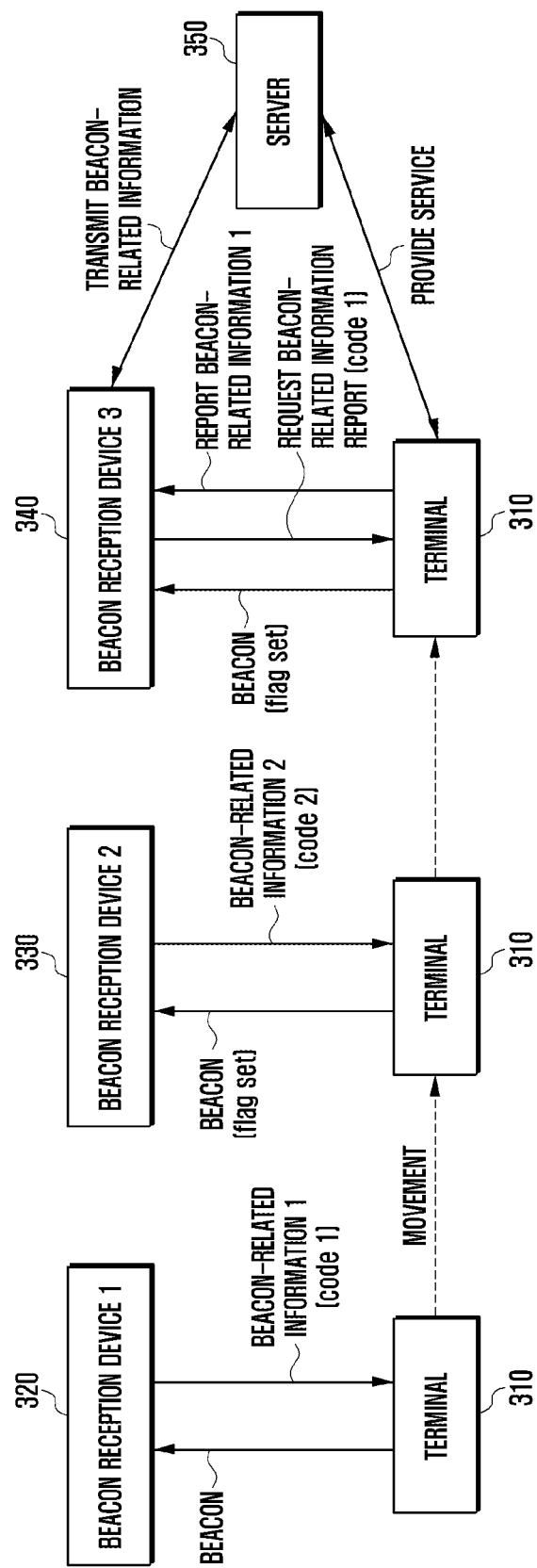
FIG. 3 is a diagram for explaining an operation scenario of a beacon system according to another embodiment of the present disclosure.

FIG. 3 is a diagram for explaining an operation scenario of a beacon system according to another embodiment of the present disclosure. FIG. 3 is a scenario that extends the embodiment of FIG. 2. In FIG. 3, a code is used to exchange the beacon-related information. In addition, the embodiment is extended to operations in the case where different beacon reception devices uses different codes. Reference is made to FIG. 2 for a description of the operations overlapping with FIG. 2.

Referring to FIG. 3, the beacon service system includes a terminal 310, a plurality of beacon reception devices 320, 330, and 340, and a server 350. The terminal 310 is a beacon transmission device that transmits a beacon. The server 350 is a service server. Assume that the terminal 310 moves in the order of beacon reception device 1 320->beacon reception device 2 330->beacon reception device 3 340. It is assumed that the beacon reception device 1 320 and the beacon reception device 2 330 are not connected to the server 350 and the beacon reception device 3 340 is connected to the server 350.

The terminal 310 transmits a beacon to the beacon reception device 310. The beacon may further include an indicator for indicating whether the beacon-related information is stored in the terminal.

The beacon reception device 1 320 may receive the beacon transmitted from the terminal 310. The beacon reception device 1 320 may generate the beacon-related information by analyzing the beacon received from the terminal 310. The beacon reception device 1 320 may transmit the beacon-related information 1 to the terminal 310. At this time, the beacon reception device 1 320 may transmit the beacon-related information 1 by mapping code 1 to the beacon-related information 1. Alternatively, the code 1 may be transmitted along with the beacon-related information 1.

The code may be a beacon-related information request code. The code may be a code previously set between the beacon reception devices 320, 330, and 340 and the server 350. The code used by each beacon reception device may be the identification information of the beacon reception device. The code may be used when the beacon-related information request code is reported. When receiving the beacon-related information report request, the terminal 310 may confirm the code included in the beacon-related information report request and confirm and transmit the beacon-related information to which the same code is mapped. On the other hand, when the code is set in the beacon reception device 1 320 to transmit the beacon-related information to the terminal 310, the code is not always mapped. For example, if the information is irrelevant to report the information to any server, the information may be opened information without applying a separate code.

The terminal 310 may map and store the received beacon-related information and the code.

For example, it can be mapped and stored as shown in Table 1.

TABLE 1

| No. | Code | Data |
|-----|------|------|
| 1 | code 1 | Beacon-related information 1 |
| ... | ... | ... |

Upon receiving the beacon-related information, the terminal 310 may change an information storage indicator of the beacon signal transmitted from the terminal. Since the beacon-related information is in the stored state, the information storage indicator may indicate that the beacon-related information is stored in the terminal 310.

Next, the terminal 310 moves to the beacon reception device 2 330. The beacon reception device 2 230 may know that there is the beacon-related information stored in the terminal 310, based on the beacon received from the terminal 310. However, since the beacon reception device 2 330 is not connected to the server, the beacon reception device 330 does not request the terminal 310 to report the beacon-related information. The beacon reception device 2 330 may generate the beacon-related information 2 based on the beacon received from the terminal 310. In addition, the code may be transmitted by being mapped to beacon-related information. For example, the beacon reception device 2 (330) may transmit code 2 by mapping the code 2 to the beacon-related information. On the other hand, each beacon reception device does not have to use different codes. Different beacon reception devices may also use the same code. For example, each beacon reception device associated with the same server may use the same code.

The terminal 310 may map and store the received beacon-related information and the code. The terminal 310 may update the previously stored Table 1 and store and manage it as shown in Table 2.

TABLE 2

| No. | Code | Data |
|-----|------|------|
| 1 | code 1 | Beacon-related information 1 |
| 2 | code 2 | Beacon-related information 2 |
| ... | ... | ... |

Since the beacon-related information is still generated in the terminal 310, the information storage indicator of the terminal indicates that there is the beacon-related information stored in the terminal 310. The terminal 310 moves to the beacon reception device 3 340.

The beacon reception device 3 340 may know that there is the beacon-related information stored in the terminal 310, based on the beacon received from the terminal 310. Since the beacon reception device 3 340 is a device connected to the server 350, the beacon reception device 3 340 may request the terminal 310 to report the beacon-related information stored in the terminal 310. For example, the beacon reception device 3 340 may transmit a beacon-related information report request message to the terminal 310. The beacon reception device 3 340 may transmit the code at the time of transmitting the beacon-related information report request message. For example, the beacon reception device 3 340 may transmit the code 1 by mapping the code 1 to the beacon-related information report request message.

The terminal 310 may report the beacon-related information stored in the beacon reception device 3 340 based on the beacon-related information report request message received from the beacon reception device 3 340. The terminal 310 may transmit the beacon-related information corresponding to the code received from the beacon reception device 3 340. If the terminal 310 receives the beacon-related information report request message to which the code 1 is mapped, the terminal 310 can report the beacon-related information to which the code 1 is mapped among the stored information. The terminal 310 may transmit the beacon-related information 1 corresponding to the code 1 to the beacon reception device 3 340 in the above Table 2. The terminal may receive the mapped code information when receiving the beacon-related information from the beacon reception device as described above, receive the mapped code information when receiving the beacon-related information report request message from the beacon reception device connected to the server, and compare the code information mapped to the beacon-related information with the code information mapped to the beacon-related information request message to prevent the beacon-related information from being collected by another server that is not previously set.

The terminal 310 may map and store the reported beacon-related information. The beacon-related information 2 is still stored in the terminal 310. Since the beacon-related information 2 is stored in the terminal 310, the information storage indicator of the beacon may indicate that there is the stored beacon-related information in the terminal 310.

The beacon reception device 3 340 may transmit the received beacon-related information to the server 350. The server 350 may analyze beacon-related information 1 received from the beacon reception device 3 340. The server 350 may provide a service to the terminal 310 based on the analyzed beacon-related information.

As described in FIG. 2, the server 350 may also include the function of the beacon reception device 3 340 or the device corresponding to the beacon reception device 3 340.

The beacon-related information may be transmitted using the code by the above-mentioned method.

Figure 4:
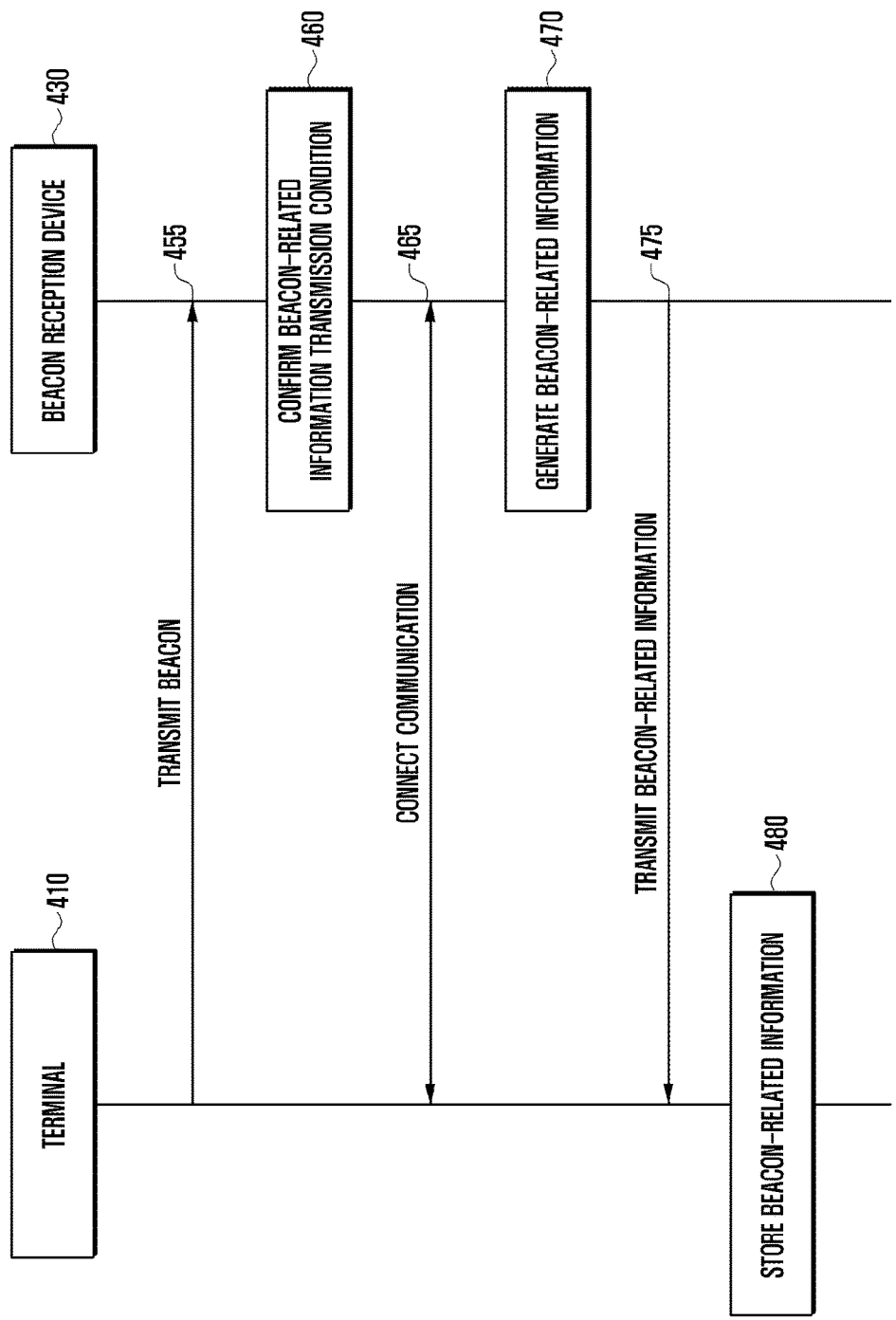
FIG. 4 is a diagram for explaining a signal flow between a terminal and a beacon reception device according to an embodiment of the present disclosure.

FIG. 4 is a diagram for explaining a signal flow between a terminal and a beacon reception device according to an embodiment of the present disclosure.

Referring to FIG. 4, a terminal 410 is a device for transmitting a beacon, and the beacon reception device 430 is a device for receiving the beacon transmitted from the terminal.

In operation 455, the terminal 410 may transmit the beacon. A beacon signal may be transmitted by broadcast and advertisement methods. In addition, the beacon signal may also be transmitted by a multicast or unicast method. The beacon may include identification information on the terminal 410 or a terminal user.

In operation 455, the beacon reception device 430 may receive the beacon transmitted from the terminal. The beacon reception device 430 may acquire information on the terminal 410 or the beacon signal by identifying the beacon received from the terminal 410. For example, the identification information included in the beacon may be acquired.

In operation 460, the beacon reception device 430 may confirm the beacon-related information transmission condition. The beacon-related information transmission condition may be previously established in the beacon reception device 430. The setting may be previously made by the beacon reception device 430 and an operator or an operation server operating the beacon reception device 430. In addition, when requesting a specific service to the beacon transmitted from the terminal 410, the terminal 410 may also confirm the beacon-related information transmission condition for providing the corresponding service. The beacon-related information and the beacon-related information generation/transmission condition will be described with reference to FIG. 5.

FIG. 5 is a view for explaining a method for confirming a beacon-related information transmission condition according to an embodiment of the present disclosure. A method of identifying a beacon-related information generation/transmission conditions and whether or not to satisfying the above conditions will be described with reference to FIG. 5.

If the beacon reception device receives the beacon from the terminal, the beacon reception device may analyze the beacon and determine whether to perform a connection with the terminal for data transmission based on the collected beacon and/or the beacon-related information generation/transmission condition. The beacon reception device may identify whether or not to satisfy the beacon-related information generation/transmission condition based on the method disclosed in FIG. 5.

If the terminal transmitting the beacon or the terminal user is included in a specific group or list, the terminal transmitting the beacon or the terminal user may be determined as a beacon-related information transmission target. The beacon reception device may store identification information (e.g., an identifier list) for identifying the terminal or the terminal user. The beacon reception device may compare an identifier included in the beacon with the identification information stored in the beacon reception device and determine as the beacon-related information transmission target if the identifier included in the beacon is included in the identification information. If the above condition is satisfied, the beacon reception device may be connected to the terminal and may generate the beacon-related information indicating that the terminal is a terminal included in the identification information. The beacon reception device may transmit the beacon-related information to the connected terminal. By doing so, the beacon-related information may be provided only to users belonging to a specific group.

If the terminal transmitting the beacon or the terminal user enters a specific distance, the terminal transmitting the beacon or the terminal user may be determined as the beacon-related information transmission target. The beacon reception device may measure the received signal strength of the received beacon. In addition, a threshold value for the received signal strength may be set in the beacon reception device. The beacon reception device may compare the measured received signal strength with the predetermined threshold value. If the measured receive signal strength is equal to or greater than the predetermined threshold value, it is determined that the terminal or the terminal user enters a specific distance, and the terminal or the terminal user may be determined as the beacon-related information target. In addition, the distance between the terminal and the beacon reception device may be estimated based on the received signal strength. At this time, if the beacon is received at a predetermined signal strength or more and the predetermined threshold time is satisfied, the terminal may be determined as the beacon-related information target. If the above condition is satisfied, the beacon reception device may be connected to the terminal and may generate the beacon-related information indicating that the terminal is a terminal located at a predetermined location. In addition, the beacon-related information including the information on the distance between the terminal and the beacon reception device may be generated. The beacon reception device may transmit the beacon-related information to the connected terminal.

If the terminal transmitting the beacon or the terminal user stays at a specific location, the terminal transmitting the beacon or the terminal user may be determined as the beacon-related information transmission target. The beacon reception device may identify the identification information included in the received beacon. A threshold value for time when the beacon is detected may be set in the beacon reception device. If the beacon including the same identification information is received, the beacon reception device may determine that the same terminal transmits the beacon. If the beacon including the same identification information satisfies the threshold value for the preset time, the beacon reception device may determine that the terminal is staying at a specific location and may be determined as the beacon-related information transmission target. If the above condition is satisfied, the beacon reception device may be connected to the terminal and may generate the beacon-related information indicating that the terminal is a terminal staying at a specific location. The beacon reception device may transmit the beacon-related information to the connected terminal.

If the received signal strength of the beacon is equal to or greater than the preset threshold value and the same identification information is detected for the preset time or more, it may also be determined that the terminal is staying within a specific distance.

If the terminal transmitting the beacon or the terminal user passes through a specific location, the terminal transmitting the beacon or the terminal user may be determined as the beacon-related information transmission target. The terminal passing through (going via) the beacon reception device is determined as the information transmission target. The beacon reception device may measure the received signal strength of the beacon. Also, the received signal strength may be mapped to time information. If the received signal strength of the beacon received from the terminal is getting stronger in response to a passage of time, the beacon reception device may determine that the terminal approaches the beacon reception device. If the received signal strength of the beacon transmitted from the terminal is getting weaker in response to a passage of time, the beacon reception device may determine that the terminal is away from the beacon reception device. As described above, if a pattern in which the received signal strength of the beacon is getting stronger in response to time and then getting weaker appears, the beacon reception device can determine that the terminal passes through the beacon reception device. Meanwhile, the beacon reception device may determine that the terminal passes through the beacon reception device when the beacon for the terminal is detected. That is, it is possible to determine that the detected beacon signal passes through the beacon reception device without comparing the received signal. If the above condition is satisfied, the beacon reception device may be connected to the terminal and may generate the beacon-related information indicating that the terminal is a terminal passing through the beacon reception device. The beacon reception device may transmit the beacon-related information to the connected terminal.

If the terminal transmitting the beacon or the terminal user requests the beacon-related information, the terminal transmitting the beacon or the terminal user may be determined as the beacon-related information transmission target. If the beacon reception device confirms the beacon-related information request from the terminal, the beacon reception device may be determined as the beacon-related information target. For example, if service request information is included in the beacon transmitted from a terminal 510, the terminal 510 may be determined as the information transmission target. In addition, if the terminal 510 is located near a beacon reception device 530, it may be determined that the terminal 510 requests the information transmission. It may be determined whether or not the terminal is located near the beacon reception device 530, based on the received signal strength of the beacon transmitted from the terminal. For example, if the received signal strength of the beacon is equal to or greater than the predetermined threshold value, it may be determined that the terminal 510 is at a nearby location from the beacon reception device 530.

Meanwhile, the method for determining an information transmission target described in FIG. 5 is only an embodiment, and in the embodiment of the present disclosure, the method for determining an information transmission target is not limited thereto. Various conditions that may be determined based on the identification information included in the beacon, the received signal strength of the beacon, and the like can be used as the method for determining an information transmission target. In addition, each transmission condition described in FIG. 5 may be combined with each other to be used as the beacon-related information generation/transmission conditions.

Return to FIG. 4. The beacon-related information transmission conditions may be confirmed by the above-mentioned method. If the beacon-related information transmission condition is satisfied, a procedure proceeds to operations under operation 465, and if the beacon-related information transmission condition is not satisfied, a procedure of the terminal 410 may end.

In operation 465, the beacon reception device 430 and the terminal 410 may establish a connection for data communication. For example, the connection may include a Bluetooth connection. The beacon reception device 430 may transmit a connection request message to the terminal 410. The message may be a BLE-"Connection Request" message. The terminal 410 may transmit a connection response message to the beacon reception device 410. Next, the terminal 410 and the beacon reception device 430 may be connected to each other.

In operation 475, the beacon reception device 430 may confirm the beacon-related information to the terminal 410. The beacon-related information may be information set to be transmitted when the beacon-related information transmission condition is satisfied in operation 460. For example, the beacon-related information may be a stamp. In this case, the beacon reception device 430 may transmit the stamp when the terminal 410 satisfies the condition of the operation 460. In this case, the server that later receives the beacon-related information from the terminal 410 may acquire predetermined information according to the presence or absence of the stamp.

On the other hand, if the beacon reception device 430 satisfies the condition of the operation 460, the beacon reception device 430 may generate and transmit the corresponding beacon-related information. In operation 470, the beacon reception device 430 may generate the beacon-related information. In addition, in the operation 475, the beacon reception device 430 may transmit the generated beacon-related information to the terminal 410. The beacon reception device 430 may be a BLEBLE-"GATT Write Characteristic" message. On the other hand, the order of the operation 475 and the operation 465 may be changed to each other.

In operation 480, the terminal 410 may store the beacon-related information received from the beacon reception device 430. The terminal 410 may transmit the stored beacon-related information to the corresponding information-collection entity when it becomes the beacon-related information transmission time. In addition, if the terminal 410 stores the beacon-related information, the terminal 410 may transmit the information storage indicator indicating that there is the beacon-related information stored in the terminal 410 by including the information storage indicator in the beacon.

FIG. 6 is a diagram for explaining a signal flow between a terminal and an information collection device according to an embodiment of the present disclosure.

Referring to FIG. 6, in operation 655, a terminal 610 may transmit a beacon. The beacon may be transmitted by including an indicator indicating whether beacon-related information is stored in the terminal 610. In operation 655, an information collection device 630 may receive a beacon. The information collection device may include a beacon reception device or a server.

In operation 660, the information collection device 630 may identify the beacon transmitted from the terminal 610. The information collection device 630 may identify the beacon information. For example, the beacon information may include an indicator indicating whether the beacon-related information is stored in the terminal 610. If it is determined that the beacon-related information is not stored in the terminal 610, the information collection device 630 may terminate the procedure with the terminal 610 or perform the operation described in FIG. 5. If it is identified that the beacon-related information is stored in the terminal 610, the information collection device 630 may perform operations under operation 665. That is, the terminal 610 may perform an operation for collecting the beacon-related information stored in the terminal 610.

In operation 665, the terminal 610 and the information collection device 630 may establish a connection for data communication. For example, the connection may include a Bluetooth connection. The information collection device 630 may transmit the connection request message to the terminal 610. The connection request message may be a BLE-"Connection Request" message. The terminal may transmit the connection response message to the information collection device 630. The terminal 610 and the information collection device 630 may hold a connected state to each other for data communication.

In operation 670, the information collection device 630 transmits the beacon-related information report request message to the terminal 610. The message may be a message requesting to report the beacon-related information stored in the terminal 610 to the information collection device 630. The message may be a BLE-"GATT Read Characteristic" message. Meanwhile, when transmitting the beacon-related information report request message, the beacon-related information report request message can be transmitted including a specific code.

In operation 675, the terminal 610 confirms the beacon-related information report message received from the information collection device 630. Based on this, the terminal may determine whether to report the stored beacon-related information. For example, if the terminal 610 receives the beacon-related information report message, it may be set to report the stored beacon-related information. In addition, the terminal 610 may also report the stored beacon-related information based on the confirmation result of the information included in the beacon-related information report message. In addition, the terminal 610 may identify the code included in the beacon-related information report message and may also determine that the beacon-related information corresponding to the identified code is transmitted.

In operation 680, the terminal 610 may transmit the stored beacon-related information based on the determination result in the operation 675. The information collection device 630 may transmit the information received from the terminal 610 to the server. The terminal 610 may selectively report the beacon-related information to the information collection device 630. That is, the terminal 610 may transmit the beacon-related information if there is a specific condition or an additional input at the time of receiving the beacon-related information report request instead of always reporting the beacon-related information in response to the beacon-related information report request. The specific condition may be a confirmation of the identification information that is previously set between the terminal 610 and the information collection device 630. The additional input may be an additional optional input of the terminal user 610.

FIG. 7 is a diagram for explaining signal flows between the respective devices in the beacon service system according to the embodiment of the present disclosure.

Referring to FIG. 7, the beacon service system includes a terminal 710, a beacon reception device 720, and a server 740. The terminal 710 is a beacon transmission device. It is assumed that the beacon reception device 720 is not in a connected state with the server 740. The information collection device 730 may be the beacon reception device. It is assumed that the information collection device 730 can be connected to the server 740.

In operation 750, the terminal 710 may transmit the beacon. The beacon may include identification information on the terminal 710 or a terminal user.

In the operation 750, the beacon reception device 720 may confirm the beacon received from the terminal. In the operation 750, the beacon reception device may acquire the information on the beacon. For example, the information included in the beacon may be acquired.

In operation 753, the beacon reception device 720 may confirm the beacon-related information transmission condition. The beacon-related information transmission condition may be previously established in the beacon reception device 720. If the beacon-related information transmission condition is satisfied, a procedure proceeds to operation 756, and if the beacon-related information transmission condition is not satisfied, a beacon service related procedure of the terminal 710 may end.

In operation 756, the beacon reception device 720 and the terminal 710 may establish a connection for data communication.

In operation 762, the beacon reception device 720 may confirm the beacon-related information to the terminal 710. The beacon-related information may include a stamp. The beacon reception device 720 may transmit the previously set beacon-related information or the stamp, generate the beacon-related information corresponding to the beacon received from the terminal (operation 759), and transmit the generated beacon-related information to the terminal 710.

In operation 765, the terminal 710 may store the beacon-related information received from the beacon reception device 720. The terminal 710 may report the stored beacon-related information when the beacon-related information transmission time or condition is satisfied.

Meanwhile, if the terminal 710 stores the beacon-related information, the terminal 710 may transmit the information storage indicator indicating that there is the beacon-related information stored in the terminal 710 by including the information storage indicator in the beacon. For example, if it is assumed that there is no beacon-related information stored in the terminal in operation 750, the information storage indicator indicating that beacon-related information is not stored in the terminal 710 may be mapped to the beacon transmitted in the operation 750. The beacon transmitted in operation 768 may be mapped to the information storage indicator indicating that the beacon-related information is stored.

In the operation 768, the terminal 718 transmits the beacon. The information collection device 730 may receive the beacon transmitted from the terminal 710. In operation 771, the information collection device 730 may identify the received beacon information. For example, the beacon information may include the information indicating whether the beacon-related information is stored in the terminal 710.

If it is identified that the beacon-related information is stored in the terminal 710, in operation 774, the information collection device 730 requests the terminal to perform the connection for data communication in operation 774. When receiving the connection response from the terminal 710, the terminal 710 and the information collection device 730 may be in a communication connection state.

In operation 777, the information collection device 730 transmits the beacon-related information report request message to the terminal 710. The message may be a message requesting to report the beacon-related information stored in the terminal 710 to the information collection device 730.

In operation 780, the terminal 710 may transmit the beacon-related information to the information collection device 730. The terminal 710 can confirm the beacon-related information report message received from the information collection device and report the beacon-related information based on the confirmation result. For example, the information report request message may include a code, and the beacon-related information corresponding to the code may be transmitted.

In operation 783, the information collection device 730 may transmit the beacon-related information received from the terminal 710 to the server 740. The server may receive the beacon-related information and analyze it.

In operation 786, the server 740 may provide a service to the terminal 710 based on the analysis results. In addition, the server 740 may provide a service not only to the terminal 710 but also to another terminal having user information corresponding to the user information of the terminal.

Figure 8:
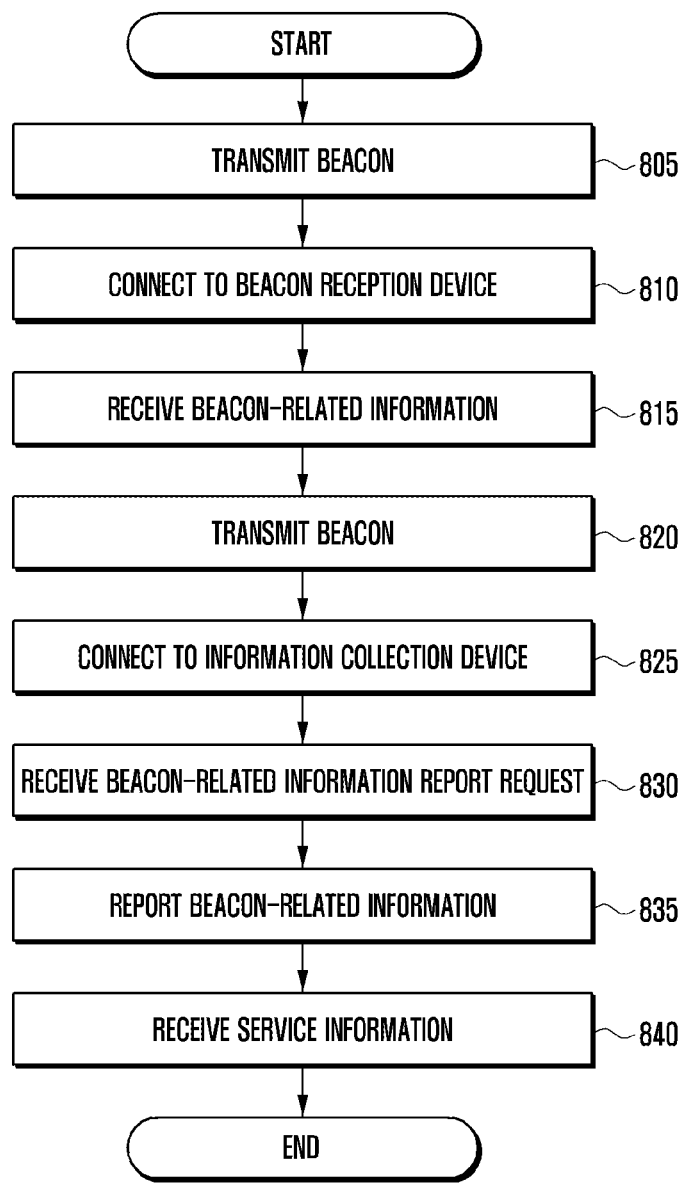
FIG. 8 is a diagram for explaining an operation of a terminal according to an embodiment of the present disclosure, in which the terminal is a beacon transmission device.

FIG. 8 is a diagram for explaining an operation of a terminal according to an embodiment of the present disclosure. The terminal is a device transmitting a beacon.

Referring to FIG. 8, in operation 805, a terminal may transmit the beacon. The beacon includes an identifier of the terminal or the terminal user. In addition, it may further include an identifier for a beacon service. The beacon may be broadcasted or advertised to an unspecified number of beacon reception devices.

In operation 810, the terminal may receive a connection request from the device that has received the beacon transmitted from the terminal. Based on the connection request, the terminal and the beacon reception device may be connected to each other. The terminal and the beacon reception device may communicate with each other by the connection.

In operation 815, the terminal may receive the beacon-related information from the beacon reception device. The beacon-related information may be the information on the beacon acquired from the beacon reception device that has received the beacon transmitted from the terminal. The beacon-related information may include code information. The code information may be used when the beacon-related information received by the terminal is stored and then reported to the information collection device. The beacon-related information will be described with reference to FIG. 5 and the like. The terminal may store the received beacon-related information. In addition, when the beacon-related information is stored, the information storage indicator may be set. This may be indicated by flag set or flag unset. In addition, if 1-bit information is used, 0 or 1 may be used to indicate whether there is the stored beacon-related information. Also, the information storage indicator may be used as a plurality of bits. When the information storage indicator is used as the plurality of bits, it may be used to identify a service provider operating a beacon service. The information storage indicator may be set, included, or mapped in a beacon. The information storage indicator may be set or included in or mapped to the beacon.

In operation 820, the terminal continuously transmits the beacon. The terminal may periodically transmit the beacon during other operations. The beacon may be transmitted at each set time point. The beacon to be transmitted may include the information storage indicator as described above.

If the beacon reception device receives the beacon transmitted from the terminal, the procedure proceeds to operation 810 again. If the beacon reception device receives the beacon transmitted from the terminal to transmit the connection request, the procedure proceeds to operation 825.

In the operation 825, the terminal receives a connection request from the information collection device. Based on the connection request, the terminal and the information collection device may perform the connection for the data communication. The information collection device may transmit the connection request message to the terminal based on the information storage indicator included in the terminal.

In operation 830, the terminal receives a beacon-related information report request from the information collection device. The beacon-related information report request may be a message requesting to report the beacon-related information stored in the terminal. Meanwhile, specific code information may be set or included in or mapped to the beacon-related information report request.

In operation 835, the terminal may report the stored beacon-related information to the information collection device based on the beacon-related information report request received from the information collection device. The terminal may also report only the information corresponding to the code among the stored beacon-related information based on the code included in the beacon-related information report request. The terminal may selectively report the beacon-related information to the information collection device. That is, when receiving the beacon-related information report request, the terminal may transmit the beacon-related information when there is a specific condition or an additional input.

After reporting the stored beacon-related information, the terminal may update the information storage report indicator. If there is no stored beacon-related information by the report, the terminal may update the state of the information storage indicator to indicate that there is no beacon-related information stored in the terminal. On the other hand, the absence of beacon-related information may be a case where the beacon-related information stored after the reporting of the beacon-related information is deleted. Even if the beacon-related information that has already been reported is not deleted immediately, since the beacon-related information is not the report target, it may also indicate that the beacon-related information to be reported is not included in the stored beacon-related information.

The beacon-related information reported by the terminal may be provided to the server providing the beacon service. The server may receive the beacon-related information and provide the beacon service. In operation 840, the terminal may receive the service information provided by the server.

Figure 9:
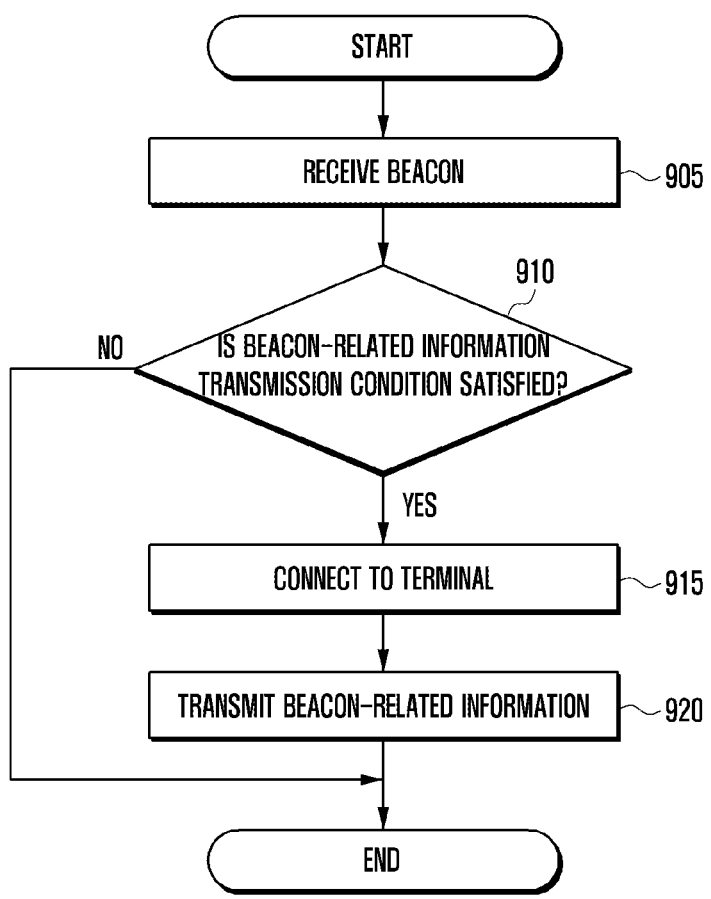
FIG. 9 is a diagram for explaining an operation of a beacon reception device according to the embodiment of the present disclosure.

FIG. 9 is a diagram for explaining an operation of a beacon reception device according to the embodiment of the present disclosure. The beacon reception device of FIG. 9 refers to a device that may not directly report the information on the collected beacon to the beacon service server. Alternatively, the beacon reception device may also be a device that may not temporarily report the information on the beacon to the server.

Referring to FIG. 9, in operation 905, the beacon reception device may receive a beacon transmitted from at least one terminal. The beacon may include an identifier of a terminal or a terminal user that has transmitted the beacon, and may also include a service identifier that identifies the purpose of transmitting the beacon.

In operation 910, the beacon reception device can determine whether to satisfy the beacon-related information transmission condition based on the received beacon. It is possible to determine whether to satisfy the beacon-related information transmission condition based on the received beacon signal, such as whether the beacon reception device is located within a predetermined range, whether the beacon reception device is a terminal passing through the beacon reception device, and the beacon reception device requests a terminal requesting information provision.

If the beacon-related information transmission condition is not satisfied, the procedure for the terminal ends. If the beacon-related information transmission condition is satisfied, the procedure proceeds to 915.

In operation 915, the beacon reception device requests a connection to the terminal that has transmitted the beacon. The connection may be a connection for data communication to transmit the beacon-related information. Based on the connection request, the beacon reception device and the terminal may be connected to each other.

In operation 920, the beacon reception device may transmit the beacon-related information to the terminal. The beacon-related information may include not only the information collected by the received beacon but also the identification information of the beacon reception device. In this way, it is possible to confirm the location or the identification information of the beacon reception device in which the beacon-related information is generated. If the beacon-related information is transmitted to the server, the server may identify the information on the terminal by using the identifier of the terminal and the identifier of the beacon reception device. The beacon-related information is transmitted to the terminal in order to report the beacon-related information report request received from the information collection device to the information collection device. In this way, even when there is no direct connection with the beacon service server, the beacon reception device may transmit the beacon-related information analyzed by the beacon reception device to the beacon service server through the terminal.

When transmitting the beacon-related information, the beacon reception device may transmit the code information by including the code information in the beacon-related information. The code information is as described above. The code information may be the identification information of the beacon reception device, or may be the identification information previously set in relation to the operator operating the beacon reception device or the beacon service server.

Figure 10:
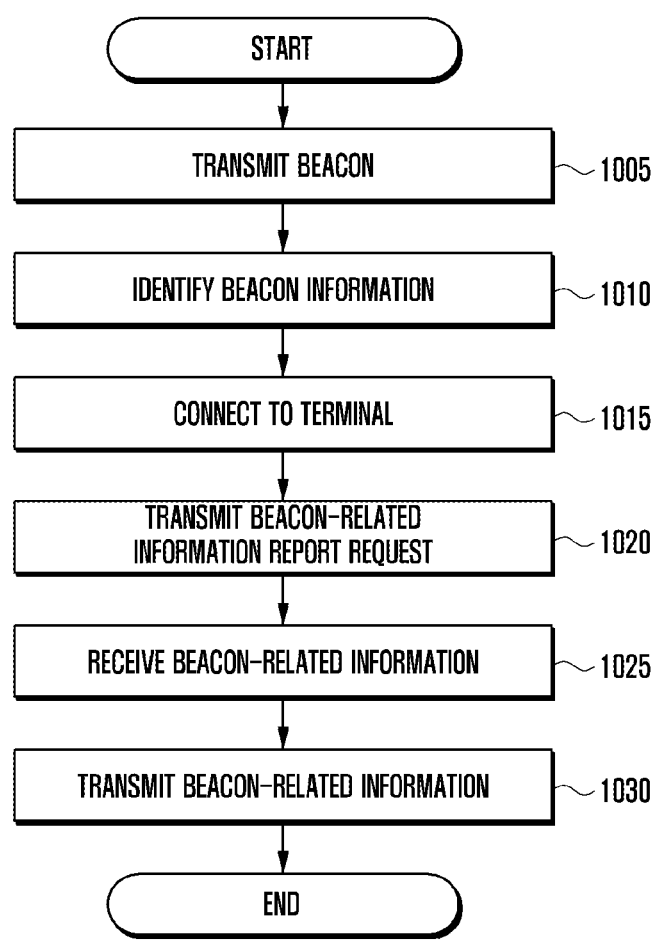
FIG. 10 is a diagram for explaining an operation of the information collection device according to the embodiment of the present disclosure.

FIG. 10 is a diagram for explaining an operation of the information collection device according to the embodiment of the present disclosure. The information collection device may be a device which may report the beacon-related information received from the terminal to the server. The information collection device may be a device that may be connected to the server among the beacon reception devices.

Referring to FIG. 10, in operation 1005, the information collection device may receive the beacon. In operation 1010, the information collection device may identify the beacon information. Here, the information collection device may identify the information storage identifier of the beacon received from the terminal. It is possible to identify whether the beacon-related information is stored in the terminal that has transmitted the beacon by identifying the information storage identifier.

If it is determined that the beacon-related information is not stored in the terminal, the procedure may end or the operation of FIG. 9 may be performed.

If it is determined that the information is stored, operations under operation 1015 may be performed. On the other hand, if it is determined that the information is stored, the information collection device may perform the operation 1015, and at the same time, perform the operation of FIG. 9 at a time interval. That is, in addition to the operation of receiving the beacon-related information stored in the terminal, the information collection device may be operated as the beacon reception device and transmit new beacon-related information based on the beacon received from the terminal.

In operation 1015, the information collection device transmits a connection request message to the terminal. Based on the message, the terminal and the information collection device perform the connection for data communication and may be in the connected state to each other.

In operation 1020, the information collection device can transmit the beacon-related information report request message to the terminal. The beacon-related information report request message may be a message requesting to report the beacon-related information stored in the terminal to the information collection device. The beacon-related information report request message may include the code information. The code information may be used as authentication information. The code information may be previously set in relation to an operator, a service provider, or a server that operates the beacon service.

In operation 1025, the information collection device may receive the beacon-related information from the terminal. The disclosed beacon-related information may be received irrespective of the code information. The beacon-related information to which the code information is mapped may be received by only the information collection device corresponding to the code information included in the beacon-related information report request message.

In operation 1030, the information collection device may transmit the beacon-related information received from the terminal the server.

On the other hand, if the terminal does not use the information storage indicator, the information collection device may transmit a message inquiring whether there is the stored beacon-related information or the stored beacon-related information report request message to the terminal after receiving the beacon signal.

When transmitting the beacon-related information inquiry message, the terminal receives the beacon-related information inquiry message and may perform the operation according to whether there is the stored beacon-related information in the terminal. If the information collection device transmits the beacon-related information report request message regardless of the information storage indicator of the terminal, the terminal transmits the beacon-related information corresponding to the beacon-related information report request message when there is the stored beacon-related information and may not perform operations under the beacon-related information report operation if there is no stored beacon-related information.

In this way, the information generated from the beacon reception device not connected to the server may be transmitted.

Figure 11:
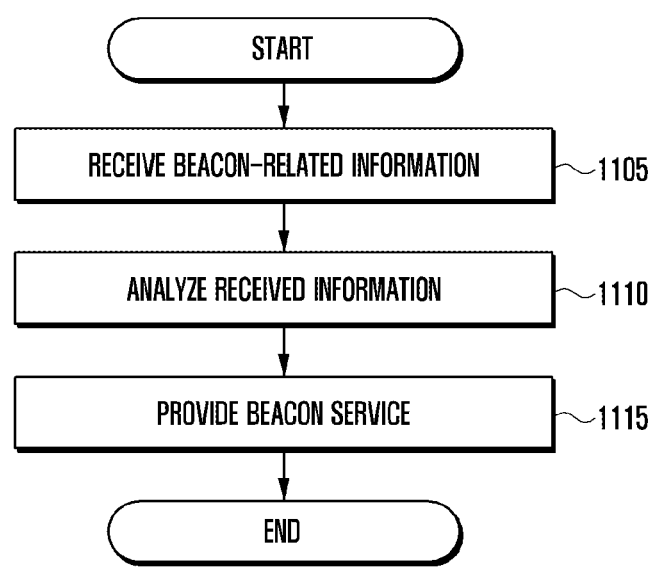
FIG. 11 is a diagram for explaining an operation of a server according to an embodiment of the present disclosure.

FIG. 11 is a diagram for explaining an operation of a server according to an embodiment of the present disclosure.

Referring to FIG. 11, in operation 1105, the server may receive the beacon-related information.

In operation 1110, the server may analyze the received beacon-related information. The received beacon-related information may include the identifier of the terminal, the identifier of the beacon reception device, and the identification information on the beacon of the terminal identified by the beacon reception device. In this way, the server or the operator of the server may determine what behavior pattern exists around the beacon reception device identified by the identified terminal user. In operation 1115, the server may provide the beacon service using the analyzed information. In this manner, the server may acquire the information on the terminal or the terminal user using the beacon reception device and the information collection device connected to the server without being connected to all the beacon reception devices.

For example, if the server is a server of a specific service provider, the service provider wants to understand a behavior pattern of consumers in a specific space and may provide a guide service or an advertisement service according to the understood behavior pattern. To this end, connecting all beacon reception devices to the server may reduce system efficiency and increase costs. The service provider can be connected to the beacon reception device that may communicate with the terminal and the terminal and can construct the efficient system using the information collection device that may be connected to the server.

Figure 12:
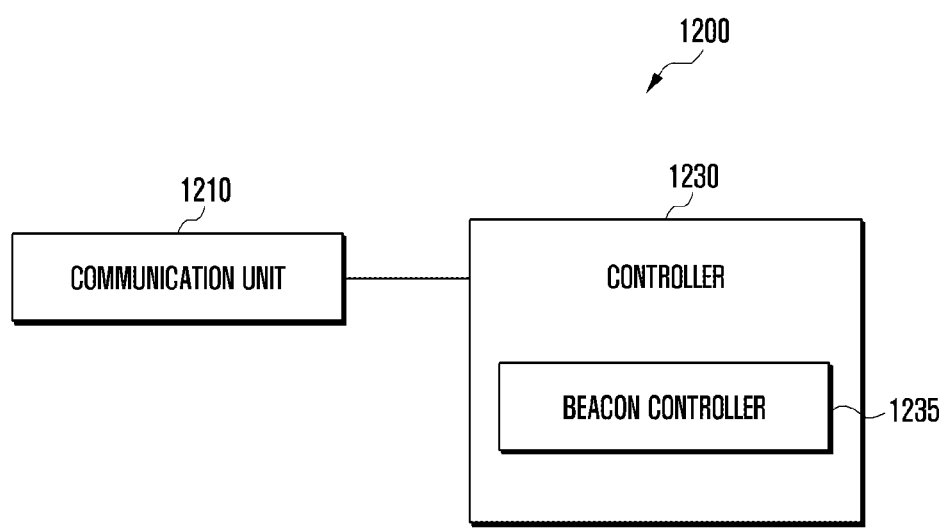
FIG. 12 is a diagram for explaining the terminal according to the embodiment of the present disclosure.

FIG. 12 is a diagram for explaining the terminal according to the embodiment of the present disclosure.

A terminal 1200 includes a communication unit 1201 and a controller 1230. The controller 1230 may further include a beacon controller 1235. The communication unit 1210 may transmit and receive a signal. For example, the communication unit 1210 may transmit the beacon and receive the beacon-related information. In addition, the communication unit may the beacon-related information report request and transmit the beacon-related information. The controller 1230 may control the overall operation of the terminal 1200. The beacon controller 1235 may control the beacon service-related operation in the terminal 1200. Meanwhile, the controller 1230 may be considered as performing the operation of the beacon controller 1235.

According to the embodiment of the present disclosure, the controller 1230 may perform a control to transmit the beacon including the identification information of the terminal 1200, receive the beacon-related information from a receiving device that has received the beacon, receive the beacon-related information report request message from the information collection device, transmit the stored beacon-related information to the information collection device.

In addition, if at least one beacon-related information is stored in the terminal 1200, the controller 1230 may perform a control to transmit the beacon including the indicator indicating that the beacon-related information is stored in the terminal 120 to the terminal 1200.

At this time, the beacon-related information may include the identification information of the beacon, the identification information of the reception device, and the distance-related information between the terminal and the reception device.

In addition, the beacon-related information includes first code information, the beacon-related information report request message includes second code information, and the controller 1230 may perform a control to compare the first code information with the second code information to transmit the corresponding beacon-related information.

Meanwhile, the operation of the terminal 1200 and the controller 1230 is not limited thereto, and in the embodiment of the present disclosure described with reference to FIGS. 1 to 11, the operation of the terminal 1200 or the beacon transmission device may be performed or may be controlled to be performed. The configuration of the block diagram of the terminal 1200 is for convenience of description, and the configuration of the terminal is not necessarily limited thereto.

Figure 13:
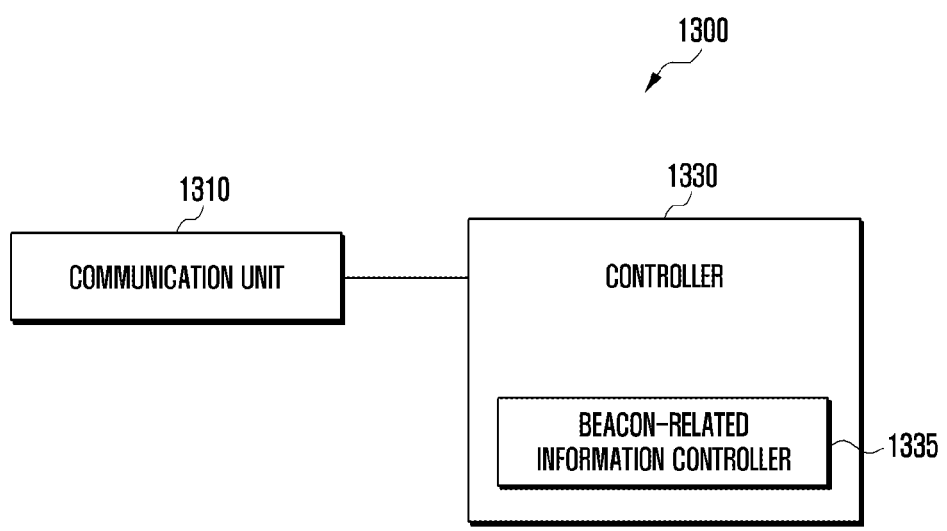
FIG. 13 is a diagram illustrating the beacon reception device according to the embodiment of the present disclosure.

FIG. 13 is a diagram illustrating the beacon reception device according to the embodiment of the present disclosure.

A beacon reception device 1300 includes a communication unit 1310 and a controller 1330. The controller 1330 may further include a beacon-related information controller 1335. The communication unit may transmit and receive a signal. For example, the communication unit 1310 may receive the beacon and transmit the beacon-related information. The controller 1330 may control the overall operation of the beacon reception device 1300. The beacon-related information controller 1335 may receive the beacon and control an operation for providing the beacon-related information. Meanwhile, the controller 1330 may be considered as performing the operation of the beacon controller 1335.

The controller 1330 may perform a control to receive the beacon from at least one terminal, determine whether the terminal is the beacon-related information transmission target, and transmit the beacon-related information based on the received beacon if the terminal is the beacon-related information transmission target.

The beacon-related information may include the identification information of the received beacon, the identification information of the beacon reception device, and the distance-related information between the terminal and the beacon reception device.

Meanwhile, the operation of the beacon reception device 1300 and the controller 1330 is not limited thereto, and in the embodiment of the present disclosure described with reference to FIGS. 1 to 11, the operation of the beacon reception device may be performed or may be controlled to be performed. The configuration of the block diagram of the terminal 1300 is for convenience of description, and the configuration of the beacon reception device is not necessarily limited thereto.

Figure 14:
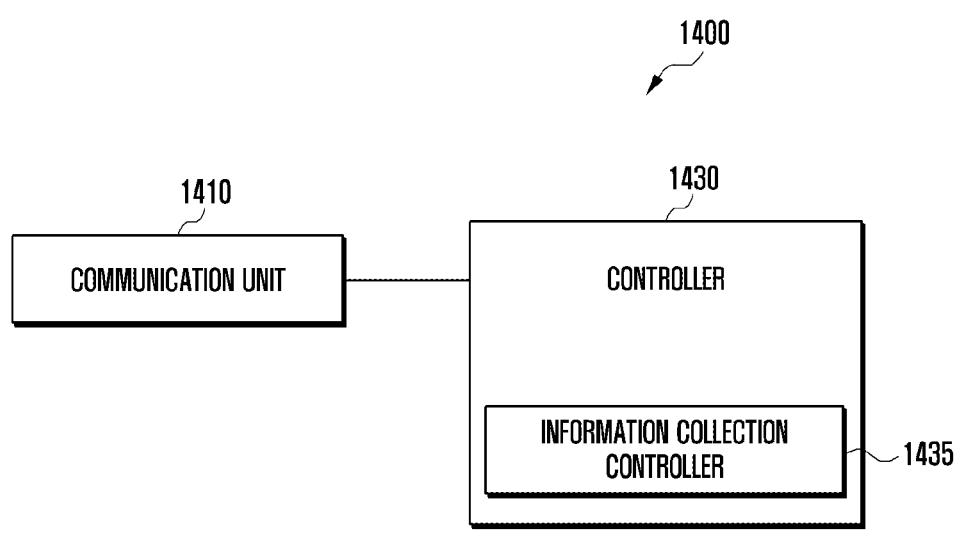
FIG. 14 is a diagram for explaining the information collection device according to the embodiment of the present disclosure.

FIG. 14 is a diagram for explaining the information collection device according to the embodiment of the present disclosure.

An information collection device 1400 includes a communication unit 1410 and a controller 1430. The controller 1430 may further include an information collection controller 1435. The communication unit 1410 may transmit and receive a signal. The communication unit may receive the beacon, transmit the beacon-related information report request message, and receive the beacon-related information. The controller 1430 may control the overall operation of the information collection device 1400. The information collection controller may control an operation for collecting the beacon-related information. Meanwhile, the controller 1430 may be considered as performing the operation of the information collection controller 1435.

According to the embodiment of the present disclosure, the controller 1430 may perform a control to receive the beacon from at least one terminal, confirm whether the beacon-related information is stored in the terminal that has transmitted the beacon, transmit the beacon-related information report request message to the terminal if the beacon-related information is stored in the terminal, and receive the beacon-related information from the terminal.

The beacon may include the indication information for indicating whether the beacon-related information is stored in the terminal transmitting the beacon.

Also, the beacon-related information report request message includes the code information, and the controller 1430 may perform a control to receive the beacon-related information corresponding to the code information.

In addition, the controller 1430 may perform a control to provide the bit-related information received from the terminal to the server. The beacon-related information may include the identification information of the beacon, the identification information of the device that has transmitted the beacon-related information to the terminal, and the distance-related information between the terminal and the device transmitting the beacon-related information to the terminal.

Meanwhile, the operation of the information collection device 1400 and the controller 1430 is not limited thereto, and in the embodiment of the present disclosure described with reference to FIGS. 1 to 11, the operation of the beacon reception device may be performed or may be controlled to be performed. The configuration of the block diagram of the information collection device 1400 is for convenience of description, and the configuration of the beacon reception device is not necessarily limited thereto.

Figure 15:
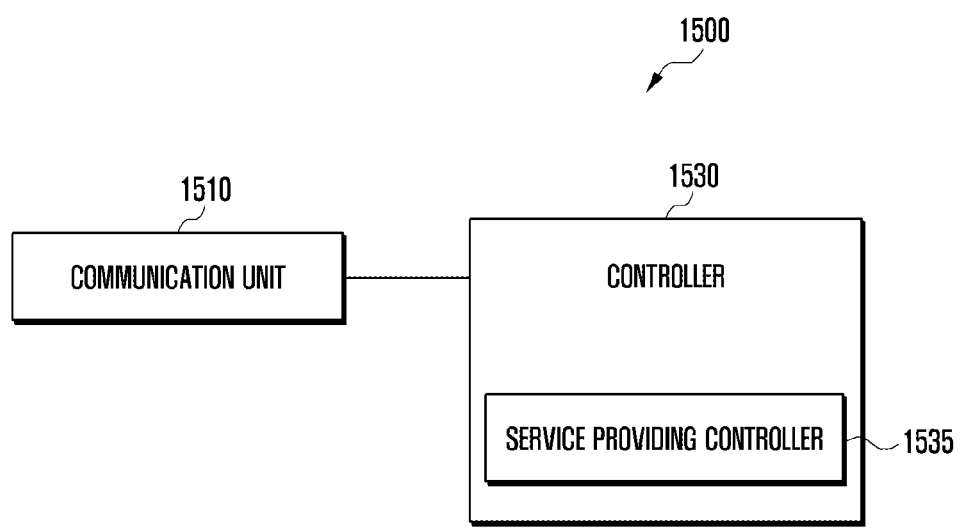
FIG. 15 is a diagram for explaining the server according to the embodiment of the present disclosure.

FIG. 15 is a diagram for explaining the server according to the embodiment of the present disclosure.

A server 1500 may include a communication unit 1510 and a controller 1530. The controller 1530 may further include a service providing controller 1535. The communication unit 1510 may transmit and receive a signal. The communication unit 1510 may receive the beacon-related information and may transmit the beacon service information. The controller 1530 may control the overall operation of the server 1500. The service providing controller 1535 may control the operation for providing the beacon service. The controller 1530 may perform the operation of the service providing controller 1535.

According to the embodiment of the present disclosure, the controller 1530 may perform a control to receive the beacon-related information from the information collection device and analyze the beacon-related information to provide the beacon service.

Meanwhile, the operation of the server 1500 and the controller 1530 is not limited thereto, and in the embodiment of the present disclosure described with reference to FIGS. 1 to 11, the operation of the server may be performed or may be controlled to be performed. The configuration of the block diagram of the server 1500 is for convenience of description, and the configuration of the server is not necessarily limited thereto.

Figure 16:
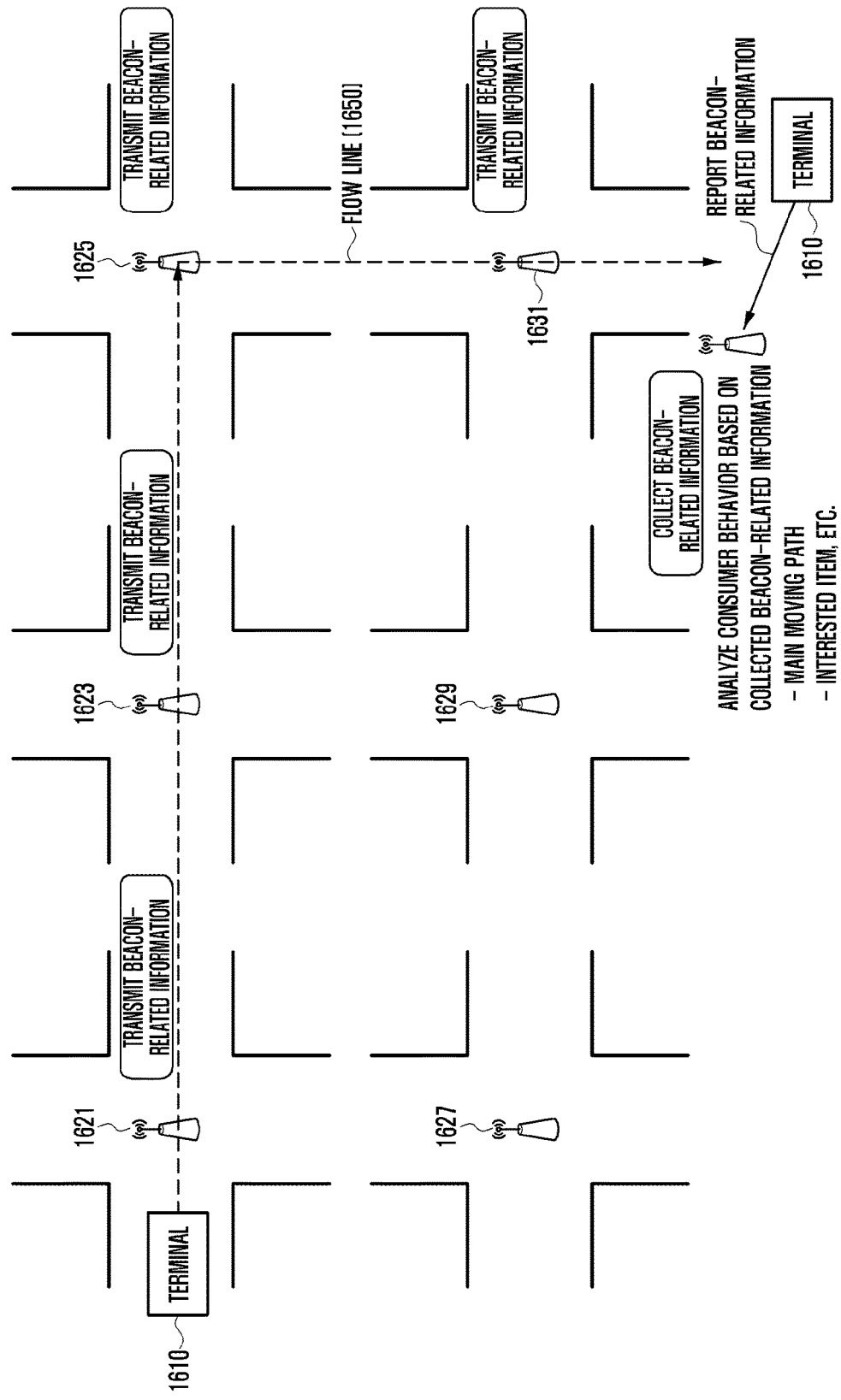
FIG. 16 is a diagram for explaining a beacon service scenario according to the embodiment of the present disclosure.

FIG. 16 is a diagram for explaining a beacon service scenario according to the embodiment of the present disclosure.

Referring to FIG. 16, consumer behavior information may be collected using the beacon service according to the embodiment of the present disclosure. The consumer behavior information may be behavior information for the beacon transmission device or behavior information for the user of the beacon transmission device.

The scenario of FIG. 16 according to the embodiment of the present disclosure may be used by being installed in a department store, a mart, or the like. According to the scenario of FIG. 16, when a plurality of beacon reception devices are installed in a specific place, the consumer behavior information may be collected using the terminal and the beacon reception device.

FIG. 16 may include a terminal 1610 for transmitting a beacon and a plurality of beacon reception devices 1621, 1623, 1625, 1627, 1629, 1631 and 1633 for receiving the beacon. It is assumed that the beacon reception device 1621, 1623, 1625, 1627, 1629, and 1631 among the plurality of beacon reception devices are not connected to the server and the beacon reception device 1633 are connected to the server to have the beacon-related information collection function.

If the beacon reception device is installed in the specific location, in the present disclosure, all beacon reception devices are not connected to the server, but the network may be efficiently constructed by using the beacon reception devices 1621, 1623, 1625, 1627, 1629, 1631, and 1633 having the function of performing the communication with the terminal 1610 and the beacon reception device 1633 connected to the server.

In the embodiment of FIG. 16, it is assumed that the terminal 1610 or the terminal user moves along a flow line 1650. When the terminal 1610 moves in order of 1621->1623->1625->1631, each beacon reception device may generate the beacon-related information and transmit the generated beacon-related information to the terminal 1610 when satisfying the beacon-related information generation/transmission condition. The terminal 1610 stores the received beacon-related information. In the embodiment of FIG. 16, the beacon-related information may include the identification information of the beacon reception device. In addition, the information on the time when the beacon-related information is generated or transmitted may be included.

In the embodiment of the present disclosure, the beacon reception device not connected to the server may not receive the beacon-related information report from the terminal. If the terminal receives the beacon-related information report request from the beacon reception device 1633, the terminal may report the stored beacon-related information to the beacon reception device 1633. The beacon-related information reported to the beacon reception device 1633 may include the identification information of the beacon reception device that has transmitted the beacon-related information received by the movement of the terminal 1610 and the information on the time when the beacon-related information is generated or transmitted.

The beacon reception device 1633 may report the beacon-related information collected from the terminal to the server. If the beacon reception device 1633 has the function of the server, it may directly analyze the beacon-related information. The server may collect and analyze the consumer behavior information based on the collected beacon information. For example, it is possible to understand the information on the flow line (moving path) of the user based on the identification information of the beacon reception device recorded for each time zone. If the server stores mapping information for places, items, services, etc. corresponding to the identification information of each beacon reception device, the user may identify places, items, services, or the like that a user is interested in. The embodiments of the present disclosure disclosed in the present specification and the accompanying drawings have been provided only as specific examples in order to assist in understanding the present disclosure and do not limit the scope of the present disclosure. Therefore, it is to be construed that in addition to the embodiments of the present disclosure, all modifications or alternations derived based on a technical spirit of the present disclosure are included in the scope of the present disclosure.

The invention claimed is:

1. A beacon service method of a terminal, comprising:
transmitting a first beacon including identification information of the terminal;
receiving beacon-related information from a reception device that received the first beacon;
transmitting a second beacon including the identification information of the terminal and an indicator indicating whether the beacon-related information has been received and stored;
receiving a beacon-related information report request message from an information collection device, wherein the information collection device transmits the beacon-related information request message in response to determining that the indicator exists in the second beacon and the beacon-related information is stored in the terminal based on the indicator; and
transmitting the stored beacon-related information to the information collection device.

2. The beacon service method of claim 1, wherein the beacon-related information includes the identification information of the first beacon, the identification information of the reception device, and distance-related information between the terminal and the reception device.

3. The beacon service method of claim 1, wherein the beacon-related information includes first code information, and the beacon-related information report request message includes second code information, and
in the transmitting of the beacon-related information, the first code information and the second code information are compared with each other to transmit the corresponding beacon-related information.

4. A terminal for a beacon service, comprising:
a transceiver configured to transmit and receive a signal; and
a controller configured to:
perform a control to transmit a beacon comprising identification information of the terminal and an indicator indicating whether beacon-related information has been received and stored,
receive beacon-related information from a reception device receiving the beacon,
receive a beacon-related information report request message from an information collection device, wherein the information collection device transmit the beacon-related information request message response to determining that the indicator exists in the second beacon and the beacon-related information is stored in the terminal based on the indicator, and
transmit stored beacon-related information to the information collection device.

5. The terminal of claim 4, wherein the beacon-related information includes the identification information of the beacon, the identification information of the reception device, and distance-related information between the terminal and the reception device.

6. The terminal of claim 4, wherein the beacon-related information includes first code information, and the beacon-related information report request message includes second code information, and the controller compares the first code information with the second code information to transmit the corresponding beacon-related information.

7. A beacon reception device, comprising:
a transceiver configured to transmit and receive a signal; and
a controller configured to:
perform a control to receive a beacon from at least one terminal comprising an indicator indicating whether beacon-related information has been received and stored,
determine whether the terminal is a beacon-related information transmission target, and
transmit the beacon-related information based on the received beacon if it is determined that the terminal is a beacon-related information transmission target.

8. The beacon reception device of claim 7, wherein the beacon-related information includes the identification information of the received beacon, the identification information of the beacon reception device, and distance-related information between the terminal and the beacon reception device.

9. An information collection device, comprising:
a transceiver configured to transmit and receive a signal; and
a controller configured to:
perform a control to receive a beacon from at least one terminal,
determine whether beacon-related information is stored in a terminal transmitting the beacon based on an indicator in the beacon,
transmit a beacon-related information report request message to the terminal based on the indicator indicating that the beacon-related information is stored in the terminal, and
receive the beacon-related information from the terminal.

10. The information collection device of claim 9, wherein the beacon-related information report request message includes code information, and the controller performs a control to receive beacon-related information corresponding to the code information.

11. The information collection device of claim 9, wherein the controller performs a control to provide the beacon-related information received from the terminal to the server.

12. The information collection device of claim 9, wherein the beacon-related information includes the identification information of the beacon, the identification information of the device transmitting the beacon-related information to the terminal, and distance-related information between the terminal and the device transmitting the beacon-related information to the terminal.

13. The beacon service method of claim 1, wherein the indicator is an information storage flag having a value of 0 or 1.

14. The beacon service method of claim 1, wherein the beacon is transmitted aperiodically and wherein the indicator is a one bit flag that is set to ON or OFF.

15. The beacon service method of claim 1, wherein the reception device is not connected to the information collection device, which provides a service to the terminal based on the beacon-related information.

16. The beacon service method of claim 1, wherein the beacon-related information is collected and stored by the terminal from a plurality of reception devices, which are access points, during a movement of the terminal near each of the plurality of reception devices,
wherein only a portion of the beacon-related information related to one of the plurality of reception devices is provided based on a map stored in the terminal and based on information included in the request for the report, and
wherein the portion of the beacon-related information is deleted after being provided to the information collection device.

* * * * *